US007057166B2

(12) United States Patent
Guevremont et al.

(10) Patent No.: US 7,057,166 B2
(45) Date of Patent: Jun. 6, 2006

(54) METHOD OF SEPARATING IONS

(75) Inventors: Roger Guevremont, Ottawa (CA); Govindanunny Thekkadath, Ottawa (CA)

(73) Assignee: Ionalytics Corporation, Ottawa (CA)

(*) Notice: Subject to any disclaimer, the term of this patent is extended or adjusted under 35 U.S.C. 154(b) by 25 days.

(21) Appl. No.: 10/875,291

(22) Filed: Jun. 25, 2004

(65) Prior Publication Data

US 2005/0127284 A1 Jun. 16, 2005

Related U.S. Application Data

(60) Provisional application No. 60/482,712, filed on Jun. 27, 2003.

(51) Int. Cl.
*B01D 59/44* (2006.01)
*H01J 49/00* (2006.01)

(52) U.S. Cl. ...................................... 250/282; 250/281

(58) Field of Classification Search ................ 250/281, 250/282

See application file for complete search history.

(56) References Cited

U.S. PATENT DOCUMENTS

| | | | |
|---|---|---|---|
| 5,106,468 | A | 4/1992 | Chimenti |
| 5,420,424 | A | 5/1995 | Carnahan et al. |
| 5,723,861 | A | 3/1998 | Carnahan et al. |
| 5,736,739 | A | 4/1998 | Uber et al. |
| 5,763,876 | A | 6/1998 | Pertinarides et al. |
| 5,789,745 | A | 8/1998 | Martin et al. |
| 5,801,379 | A | 9/1998 | Kouznetsov |
| 5,869,831 | A | 2/1999 | De La Mora et al. |
| 5,905,258 | A | 5/1999 | Clemmer et al. |
| 6,041,734 | A | 3/2000 | Raoux et al. |
| 6,124,592 | A | 9/2000 | Spangler |
| 6,162,709 | A | 12/2000 | Raoux et al. |

(Continued)

FOREIGN PATENT DOCUMENTS

| | | |
|---|---|---|
| RU | 966583 | 10/1982 |

(Continued)

OTHER PUBLICATIONS

Purves et al., Mass Spectrometric Characterization of a High-field Asymetric Waveform Ion Mobility Spectrometer, Dec. 1998, Review of Scientific Instruments, vol. 60, No. 12, pp. 4049-4105.*

(Continued)

*Primary Examiner*—Nikita Wells
*Assistant Examiner*—Jennifer Yantomo
(74) *Attorney, Agent, or Firm*—Freedman & Associates

(57) ABSTRACT

A method of separating ions, including a first species of ion and a second species of ion that are transmitted through an analyzer region under substantially identical electrical field conditions, is provided. The method includes separating ions within an analyzer region according to the FAIMS principle, such that the first species of ion and the second species of ion are selectively transmitted along a time-averaged first direction through a portion of the analyzer region between the ion origin end and the ion detection end. Subsequently, the first species of ion and the second species of ion within the analyzer region are separated according to a difference in low field ion mobility values, such that relatively more of one of the first species of ion and the second species of ion is transmitted to an ion detection end than is transmitted absent separating the first species of ion and the second species of ion within the analyzer region according to a difference in their low field ion mobility values. The ions are transmitted through the remainder of the analyzer region under normal FAIMS operating conditions.

29 Claims, 17 Drawing Sheets

U.S. PATENT DOCUMENTS

| | | | | |
|---|---|---|---|---|
| 6,188,066 | B1 | 2/2001 | Whitehouse et al. | |
| 6,323,482 | B1 | 11/2001 | Clemmer et al. | |
| 6,495,823 | B1 | 12/2002 | Miller et al. | |
| 6,504,149 | B1 | 1/2003 | Guevremont et al. | |
| 6,512,224 | B1 | 1/2003 | Miller et al. | |
| 6,534,764 | B1 | 3/2003 | Verentchikov et al. | |
| 6,621,077 | B1 | 9/2003 | Guevremont et al. | |
| 6,639,212 | B1 | 10/2003 | Guevremont et al. | |
| 6,653,627 | B1 | 11/2003 | Guevremont et al. | |
| 6,690,004 | B1 * | 2/2004 | Miller et al. | 250/286 |
| 6,815,669 | B1 * | 11/2004 | Miller et al. | 250/286 |
| 2001/0030285 | A1 | 10/2001 | Miller et al. | |
| 2002/0014586 | A1 | 2/2002 | Clemmer | |
| 2003/0020012 | A1 | 1/2003 | Guevremont et al. | |
| 2003/0038235 | A1 | 2/2003 | Guevremont et al. | |
| 2003/0052263 | A1 | 3/2003 | Guevremont et al. | |
| 2003/0057367 | A1 | 3/2003 | Guevremont et al. | |
| 2003/0057369 | A1 | 3/2003 | Guevremont et al. | |
| 2003/0146377 | A1 | 8/2003 | Miller et al. | |
| 2003/0150985 | A1 | 8/2003 | Guevremont et al. | |
| 2003/0213904 | A9 | 11/2003 | Guevremont et al. | |

FOREIGN PATENT DOCUMENTS

| | | |
|---|---|---|
| RU | 2105298 | 2/1998 |
| WO | WO 00/63949 A1 | 10/2000 |
| WO | WO 01/22049 A2 | 3/2001 |

OTHER PUBLICATIONS

U.S. Appl. No. 09/762,238, Guevremont et al., Not published.

Carr et al., "Plasma Chromatography", (1984), Plenum Press, New York.

Mason et al., "Transport Properties of Ions in Gases", (1988), Wiley, New York.

Buryakov et al., "A New Method of Separation of Multi-Atomic Ions by Mobility at Atmospheric Pressure using a High-Frequency Amplitude-Asymmetric Strong Electric Field", Int. J. Mass Spectrom. Ion Processes, No. 128, pp. 143-148, (1993), Elsevier Science Publishers B.V.

Eiceman et al., "Ion Mobility Spectrometry", (1994), CRC Press, Florida.

Carnahan et al., "Field Ion Spectrometry—A New Analytical Technology for Trace Gas Analysis", Proceedings of the 41st Annual ISA Analysis Division Symposium, paper #96-009, pp. 87-95, (1996), Framingham, MA, USA.

Riegner et al., "Qualitative Evaluation of Field Ion Spectrometry for Chemical Warfare Agent Detection", Proceedings of the 45th ASMS Conference on Mass Spectrometry and Allied Topics, Palm Springs, California, pp. 473, (1997).

Purves et al., "Mass Spectrometric Characterization of a High-Field Asymmetric Waveform Ion Mobility Spectrometer", Review of Scientific Instruments, vol. 69, No. 12, pp. 4904-4105, (Dec. 1998), American Institute of Physics.

Henderson et al., "ESI/Ion Trap/Ion Mobility/Time-of-Flight Mass Spectrometry for Rapid and Sensitive Analysis of Biomolecular Mixtures", Anal. Chem. 1999, vol. 71, No. 2, pp. 291-301, (Jan. 15, 1999), American Chemical Society.

Guevremont et al., "Atmospheric Pressure Ion Focusing in a High-Field Asymmetric Waveform Ion Mobility Spectrometer", Review of Scientific Instruments, vol. 70, No. 2, pp. 1370-1/383, (Feb. 1999), American Institute of Physics.

Krylov, "A Method of Reducing Diffusion Losses in a Drift Spectrometer", Tech. Phys., vol. 44, No. 1, pp. 113-116, (1999), American Institute of Physics.

* cited by examiner

A

B'

C'

C"

A

B

C'

C"

METHOD OF SEPARATING IONS

CROSS-REFERENCE TO RELATED APPLICATIONS

This Application claims the benefit of U.S. Provisional Patent Application No. 60/482,712, filed on Jun. 27, 2003.

FIELD OF THE INVENTION

The instant invention relates generally to a method of separating ions. In particular, the instant invention relates to a method of separating ions according to the principles of High Field Asymmetric Waveform Ion Mobility Spectrometry (FAIMS) in combination with the principles of ion drift mobility.

BACKGROUND OF THE INVENTION

High sensitivity and amenability to miniaturization for field-portable applications have helped to make ion mobility spectrometry (IMS) an important technique for the detection of many compounds, including narcotics, explosives, and chemical warfare agents as described, for example, by G. Eiceman and Z. Karpas in their book entitled "Ion Mobility Spectrometry" (CRC, Boca Raton, 1994), which is incorporated by reference herein. In IMS, gas-phase ion mobilities are determined using a drift tube with a constant electric field. Ions are separated in the drift tube on the basis of differences in their drift velocities. At low electric field strength, for example 200 V/cm, the drift velocity of an ion is proportional to the applied electric field strength, and the mobility, K, which is determined from experimentation, is independent of the applied electric field. Additionally, in IMS the ions travel through a bath gas that is at sufficiently high pressure that the ions rapidly reach constant velocity when driven by the force of an electric field that is constant both in time and location. This is to be clearly distinguished from those techniques, most of which are related to mass spectrometry, in which the gas pressure is sufficiently low that, if under the influence of a constant electric field, the ions continue to accelerate.

E. A. Mason and E. W. McDaniel in their book entitled "Transport Properties of Ions in Gases" (Wiley, N.Y., 1988), which is incorporated by reference herein, teach that at high electric field strength, for instance fields stronger than approximately 5,000 V/cm, the ion drift velocity is no longer directly proportional to the applied electric field, and K is better represented by $K_H$, a non-constant high field mobility term. The dependence of $K_H$ on the applied electric field has been the basis for the development of high field asymmetric waveform ion mobility spectrometry (FAIMS). Ions are separated in FAIMS on the basis of a difference in the mobility of an ion at high field strength, $K_H$, relative to the mobility of the ion at low field strength, K. In other words, the ions are separated due to the compound dependent behavior of $K_H$ as a function of the applied electric field strength.

In general, a device for separating ions according to the FAIMS principle has an analyzer region that is defined by a space between first and second spaced-apart electrodes. The first electrode is maintained at a selected dc voltage, often at ground potential, while the second electrode has an asymmetric waveform V(t) applied to it. The asymmetric waveform V(t) is composed of a repeating pattern including a high voltage component, $V_H$, lasting for a short period of time $t_H$ and a lower voltage component, $V_L$, of opposite polarity, lasting a longer period of time $t_L$. The waveform is synthesized such that the integrated voltage-time product, and thus the field-time product, applied to the second electrode during each complete cycle of the waveform is zero, for instance $V_H t_H + V_L t_L = 0$; for example +2000 V for 10 µs followed by −1000 V for 20 µs. The peak voltage during the shorter, high voltage portion of the waveform is called the "dispersion voltage" or DV, which is identically referred to as the applied asymmetric waveform voltage.

Generally, the ions that are to be separated are entrained in a stream of gas flowing through the FAIMS analyzer region, for example between a pair of horizontally oriented, spaced-apart electrodes. Accordingly, the net motion of an ion within the analyzer region is the sum of a horizontal x-axis component due to the stream of gas and a transverse y-axis component due to the applied electric field. During the high voltage portion of the waveform, an ion moves with a y-axis velocity component given by $v_H = K_H E_H$, where $E_H$ is the applied field, and $K_H$ is the high field ion mobility under operating electric field, pressure and temperature conditions. The distance traveled by the ion during the high voltage portion of the waveform is given by $d_H = v_H t_H = K_H E_H t_H$, where $t_H$ is the time period of the applied high voltage. During the longer duration, opposite polarity, low voltage portion of the asymmetric waveform, the y-axis velocity component of the ion is $v_L = KE_L$, where K is the low field ion mobility under operating pressure and temperature conditions. The distance traveled is $d_L = v_L t_L = KE_L t_L$. Since the asymmetric waveform ensures that $(V_H t_H) + (V_L t_L) = 0$, the field-time products $E_H t_H$ and $E_L t_L$ are equal in magnitude. Thus, if $K_H$ and K are identical, $d_H$ and $d_L$ are equal, and the ion is returned to its original position along the y-axis during the negative cycle of the waveform. If at $E_H$ the mobility $K_H > K$, the ion experiences a net displacement from its original position relative to the y-axis. For example, if a positive ion travels farther during the positive portion of the waveform, for instance $d_H > d_L$, then the ion migrates away from the second electrode and eventually will be neutralized at the first electrode.

In order to reverse the transverse drift of the positive ion in the above example, a constant negative dc voltage is applied to the second electrode (superimposed upon the asymmetric waveform). The difference between the dc voltage that is applied to the first electrode and the dc voltage that is applied to the second electrode is called the "compensation voltage" (CV). The CV prevents the ion from migrating toward either the second or the first electrode. If ions derived from two compounds respond differently to the applied high strength electric fields, the ratio of $K_H$ to K may be different for each compound. Consequently, the magnitude of the CV that is necessary to prevent the drift of the ion toward either electrode is also different for each compound. Ideally, when a mixture including several species of ions, each with a unique $K_H$/K ratio, is being analyzed by FAIMS, only one species of ion is selectively transmitted to a detector for a given combination of CV and DV. In one type of FAIMS experiment, the applied CV is scanned with time, for instance the CV is slowly ramped or optionally the CV is stepped from one voltage to a next voltage, and a resulting intensity of transmitted ions is measured. In this way a CV spectrum showing the total ion current as a function of CV, is obtained.

In practice, a mixture of ions may include two different species of ions that cannot be separated according to the FAIMS principle alone. For instance, the two different species of ions may have coincidentally substantially an identical ratio of high field mobility to low field mobility (same $K_H/K$ ratio), and thus each species of ion is "selectively" transmitted at a same given combination of CV and DV. For example, a first type of ion has a low field mobility of 2.0 but at high value of E/N this mobility is increased by 5% so that the high field mobility is 2.1 $cm^2/Vs$. A second type of ion in this example has a low field mobility of 2.2 but at high E/N the mobility also increases by 5% so that the high field mobility is 2.31 $cm^2/Vs$. The two ions have different mobility at low field and also have different mobility at high field, but coincidentally the ratio of high field mobility to low field mobility is identical. In this example $K_H/K$ for both ions is 1.05. In such a case, the CV spectrum peak corresponding to one of the two different species of ions overlaps completely or partially with the CV spectrum peak corresponding to the other of the two different species of ions.

Problems may also be encountered when the two different species of ions have similar but non-identical ratio of high field mobility to low field mobility (similar $K_H/K$ ratio). In this case, FAIMS may be unable to resolve the two different species of ions. The resolution of a FAIMS device is defined in terms of the extent to which ions having similar mobility properties as a function of electric field strength are separated under a set of predetermined operating conditions. In the example above, the two types of ions both had $K_H/K$ ratios of 1.05 and could not be separated by FAIMS. In another case however, two other types of ions, which are less than identical, may have $K_H/K$ ratios of 1.05 and 1.055. Yet another pair may have ratios that differ even more widely, for example 1.02 and 1.09. Thus, a high-resolution FAIMS device transmits selectively a relatively small range of different ion species having similar mobility properties ($K_H/K$ ratios of these ions are very similar to each other), whereas a low-resolution FAIMS device transmits selectively a relatively large range of different ion species having less-similar mobility properties ($K_H/K$ ratios of these ions may differ from each other by a wider margin). For instance, the resolution of FAIMS in a cylindrical geometry FAIMS is compromised relative to the resolution in a parallel plate geometry FAIMS, because the cylindrical geometry FAIMS has the capability of focusing ions. This focusing action means that ions of a wider range of mobility characteristics are simultaneously transmitted within the analyzer region of the cylindrical geometry FAIMS. A cylindrical geometry FAIMS with narrow electrodes has the strongest focusing action, but the lowest resolution for separating ions. As the radii of curvature are increased, the focusing action becomes weaker, and the ability of FAIMS to simultaneously focus ions of similar high-field mobility characteristics is similarly decreased. This means that the resolution of FAIMS increases as the radii of the electrodes are increased, with parallel plate geometry FAIMS expected to have the maximum attainable resolution.

It is known to provide a second analyzer in tandem with FAIMS. For instance, in co-pending U.S. patent application Ser. No. 10/220,603, which was filed on Sep. 3, 2002 and is incorporated by reference herein, a tandem FAIMS/ion mobility spectrometer is described. Ions are provided via an outlet from a FAIMS analyzer into a separate ion mobility analyzer, such as for instance a drift tube ion mobility spectrometer (DTIMS). Accordingly, ions that may not be separated on the basis of differences in high field ion mobility behavior using FAIMS may never the less be separated on the basis of their absolute low-field ion mobility properties using DTIMS. Unfortunately, each analyzer has finite transmission efficiency, such that some of the ions of interest are lost during analysis within each of the two separate analyzers. Furthermore, transmission of ions from one analyzer to another analyzer also results in loss of some of the ions of interest due to collisions with electrode surfaces near the analyzer outlet or inlet. The overall result is low effective ion transmission efficiency and correspondingly low sensitivity. It is a further disadvantage of the above-mentioned system that additional time is required to separate ions using separate FAIMS and DTIMS analyzers. It is also a disadvantage of the above-mentioned system that the ions pass through DTIMS in packets which arrive at the end of the drift tube as a function of time, and therefore add a requirement of specialized detection and analysis systems to interpret this signal. In this last example an expensive TOF mass spectrometer is typically employed to detect ions from a DTIMS, rather than a less-expensive quadrupole mass spectrometer.

Although a separation of ions using the FAIMS approach has significant value for simplification of complex mixtures, in some instances further separation capability is desirable. As discussed supra ions are separated in FAIMS on the basis of a field dependent change of the mobility properties of the ions. Accordingly, it may sometimes occur that a first species of ion and a second species of ion will have substantially identical field dependent changes of the mobility properties. In such a case, the first species of ion and the second species of ion cannot be separated using the FAIMS approach alone. Furthermore, small cylindrical FAIMS electrodes are known to achieve improved ion focusing capability at the expense of resolution. Accordingly, there is an ongoing need for a method of separating ions that overcomes some of the limitations of the prior art.

SUMMARY OF THE INVENTION

It is an object of the instant invention to provide a method of separating ions that overcomes some of the limitations of the prior art.

It is another object of the instant invention to provide a method of separating ions that is based on a combination of FAIMS and DTIMS principles.

It is yet another object of the instant invention to provide a method of separating ions that may be implemented using a single FAIMS electrode configuration.

In accordance with an aspect of the instant invention, there is provided a method of separating ions, including a first species of ion and a second species of ion that are transmitted through an analyzer region under substantially identical electrical field conditions, the method comprising: providing an analyzer region that is defined by a space between a first electrode surface and a second electrode surface and that has a length that is defined between an ion origin end and an ion detection end; providing ions within the analyzer region at the ion origin end thereof, the ions including a first species of ion and a second species of ion; during a period of time that is shorter than the time that is required for an ion to traverse the length of the analyzer region under a given set of operating conditions, providing sequentially: i) first electric field conditions for substantially retaining the first species of ion within the analyzer region, by the application of an asymmetric waveform potential to one of the first electrode surface and the second electrode surface, and by the application of a first direct current potential difference between the first electrode surface and the second electrode surface; ii) second electric field conditions for preferentially colliding the second species of ion with one of the first electrode surface and the second electrode surface, by the application of an asymmetric waveform potential to the one of the first electrode surface and the second electrode surface, and by the application of a second direct current potential difference between the first electrode surface and the second electrode surface, the second direct current potential difference having at least one of a direction and a magnitude that is different compared to that of the first direct current potential difference; and, iii) third electric field conditions for substantially retaining the first species of ion within the analyzer region, by the application of an asymmetric waveform potential to the one of the first electrode surface and the second electrode surface, and by the application of a third direct current potential difference between the first electrode surface and the second electrode surface.

In accordance with another aspect of the instant invention, there is provided a method of separating ions, including a first species of ion and a second species of ion that are transmitted through an analyzer region under substantially identical electrical field conditions, the method comprising: providing an analyzer region having an ion origin end and an ion detection end, the analyzer region capable of supporting electrical field conditions extending continuously from the ion origin end to the ion detection end for separating ions according to the FAIMS principle; providing ions within the analyzer region at the ion origin end, the ions including a first species of ion and a second species of ion; separating the ions within the analyzer region according to the FAIMS principle, such that the first species of ion and the second species of ion are selectively transmitted along a time-averaged first direction through a portion of the analyzer region between the ion origin end and the ion detection end; and, separating the first species of ion and the second species of ion within the analyzer region according to a difference in their low field ion mobility values, such that relatively more of one of the first species of ion and the second species of ion is transmitted to the ion detection end than is transmitted absent separating the first species of ion and the second species of ion within the analyzer region according to a difference in their low field ion mobility values.

In accordance with still another aspect of the instant invention, there is provided a method of separating ions, including a first species of ion and a second species of ion that are transmitted through an analyzer region under substantially identical electrical field conditions, the method comprising: providing an analyzer region that is defined by a space between a first electrode surface and a second electrode surface and that has a length that is defined between an ion origin end and an ion detection end; providing ions within the analyzer region at the ion origin end thereof, the ions including a first species of ion and a second species of ion; subjecting the ions within the analyzer region to a first transverse electric field, the first transverse electric field suitable for substantially retaining the first species of ion and the second species of ion within the analyzer region and resulting from the application of an asymmetric waveform potential to one of the first electrode surface and the second electrode surface, and by the application of a direct current potential difference between the first electrode surface and the second electrode surface; at least partially separating the second species of ion from the first species of ion by changing at least one of a magnitude and a direction of the direct current potential difference, to effect a drifting motion of at least some of the ions that were previously subjected to the transverse electric field in a direction substantially toward one of the first electrode surface and the second electrode surface, so as to preferentially collide the second species of ion with the one of the first electrode surface and the second electrode surface; and, restoring the first transverse electric field, to substantially retain the first species of ion within the analyzer subsequent to the second species of ion being at least partially separated from the first species of ion.

U.S. Provisional Patent Application No. 60/482,712, filed on Jun. 27, 2003, is incorporated herein by reference.

BRIEF DESCRIPTION OF THE DRAWINGS

Exemplary embodiments of the invention will now be described in conjunction with the following drawings, in which similar reference numerals designate similar items.

DESCRIPTION OF THE PREFERRED EMBODIMENTS

Figure 1A:
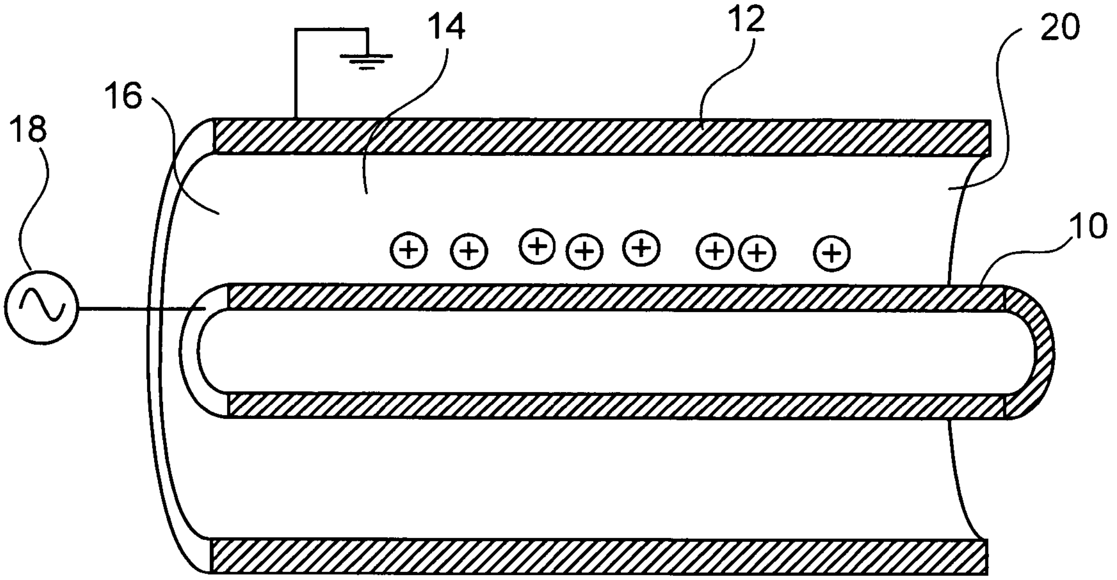
FIG. 1*a* shows a plurality of ions of a same species within a focus region near an inner electrode of a cylindrical geometry FAIMS.

The following description is presented to enable a person skilled in the art to make and use the invention, and is provided in the context of particular applications thereof. Various modifications of the disclosed embodiments will be apparent to those of skill in the art, and the general principles defined herein are readily applied to other embodiments and applications without departing from the spirit and scope of the invention. Thus, the present invention is not intended to be limited to the embodiments disclosed, but is to be accorded the widest scope consistent with the principles and features disclosed herein.

FIGS. 1*a* through 1*e* illustrate collectively the simulated net motion of a plurality of ions of a same species during application of a transient pulse of a direct current offset voltage between an inner FAIMS electrode 10 and an outer FAIMS electrode 12. Ions are provided at an ion origin end 16 of an analyzer region 14. For instance, ions are produced externally to the analyzer region 14 and are introduced into the analyzer region 14 via a not illustrated ion inlet orifice. Several non-limiting examples of ionization sources that may be used to produce ions externally to the analyzer region 14 include an electrospray ionization source, a photoionization source, a radioactive decay ionization source, a corona discharge ionization source, a chemical ionization source, or another suitable ionization source. Alternatively, ions are formed directly within the analyzer region 14. Several non-limiting examples of ionization sources that may be used to produce ions directly within the analyzer region 14 include a photoionization source, a radioactive decay ionization source, a corona discharge ionization source, a chemical ionization source, or another suitable ionization source. The ions are focused within the analyzer region 14 between the inner electrode 10 and the outer electrode 12 by the action of a transverse electric field that is formed by the application of an asymmetric waveform potential (DV) to one of the inner electrode 10 and the outer electrode 12, and by the application of a direct current compensation potential (CV) between the inner electrode 10 and the outer electrode 12 (CV superimposed upon the asymmetric waveform potential). For instance, electrical controller 18 applies the asymmetric waveform potential and the superimposed compensation potential via a not illustrated electrical contact on inner electrode 10. Optionally, a flow of a carrier gas is introduced via a not illustrated carrier gas inlet for transporting the ions along the length of the analyzer region 14. Those ions that do not collide with an electrode surface under the influence of the applied transverse electrical field are selectively transmitted through the analyzer region 14 to an ion-detecting end 20 thereof.

Referring now to FIG. 1*a*, shown is a plurality of ions of a same species within a focus region near the inner electrode 10. This is the normal condition in a narrow diameter FAIMS with a particular ion species being focused near the inner electrode at a given combination of applied CV and DV. Under these conditions the ions are focused into a narrow radial region, the spread of ions being dictated by diffusion and space charge ion-ion mutual electrostatic repulsion. The ions are optionally carried along the length of the analyzer region 14 by the flow of a not illustrated carrier gas.

Figure 1B:
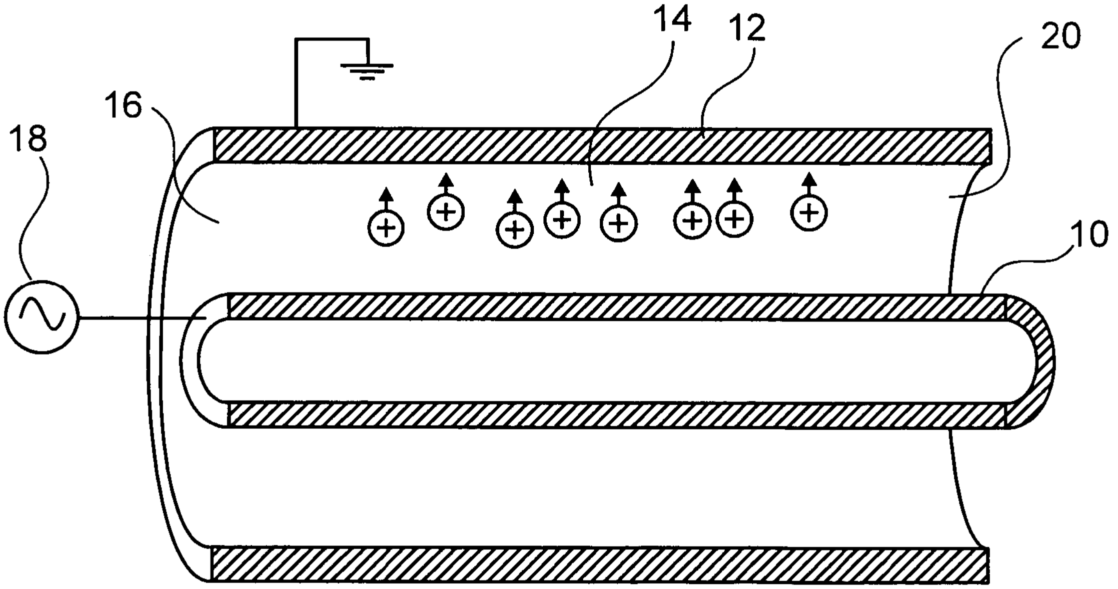
FIG. 1*b* shows the plurality of ions of FIG. 1*a* soon after a direct current offset voltage has been applied between the inner electrode and an outer electrode of the cylindrical geometry FAIMS.

Referring now to FIG. 1*b*, shown is the plurality of ions of FIG. 1*a* soon after a direct current offset voltage has been applied between the inner electrode 10 and an outer electrode 12 of the cylindrical geometry FAIMS. The ions of positive polarity, which were focussed near the inner electrode 10 at FIG. 1*a*, are moving rapidly toward the outer electrode 12 in FIG. 1*b*. If the direct current offset voltage remains for very long, the ions will collide with the outer electrode 12. Other, similar ions (not shown) with higher drift mobility will move more rapidly toward the outer electrode 12, and other ions (not shown) with lower drift mobility will move more slowly. Application of this direct current offset voltage gives rise to a separation of ions in a radial direction. This separation of ions in a radial direction is identical to conventional drift ion mobility spectrometry.

Figure 1C:
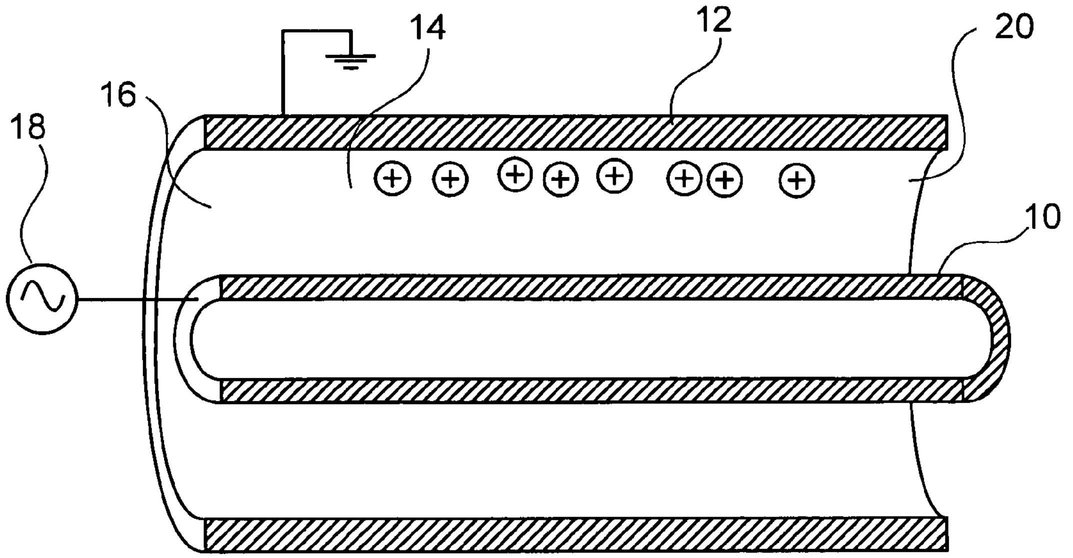
FIG. 1*c* shows the plurality of ions of FIG. 1*a* soon after the direct current offset voltage between the inner electrode and the outer electrode has been removed.

Referring now to FIG. 1*c*, shown is the plurality of ions of FIG. 1*a* soon after the direct current offset voltage between the inner electrode 10 and the outer electrode 12 has been removed. Prior to collision with the outer electrode 12 the direct current offset voltage is removed, and the ions stop their radially outward motion. However, any species of ions with drift mobilities higher than that of the ions illustrated at FIGS. 1*a*–1*e* will have already collided with the outer electrode 12. All ions with low mobility, for instance a mobility that is less than or equal to that of the ions illustrated at FIGS. 1*a*–1*e*, will remain within the analyzer region 14. As shown at FIG. 1*c*, the original narrow radial spacing of the ions is preserved, as long as the length of time of the application of the direct current offset voltage is short. Of course, a longer period of time allows the ions to distribute in space due to diffusion and space charge repulsion.

Figure 1D:
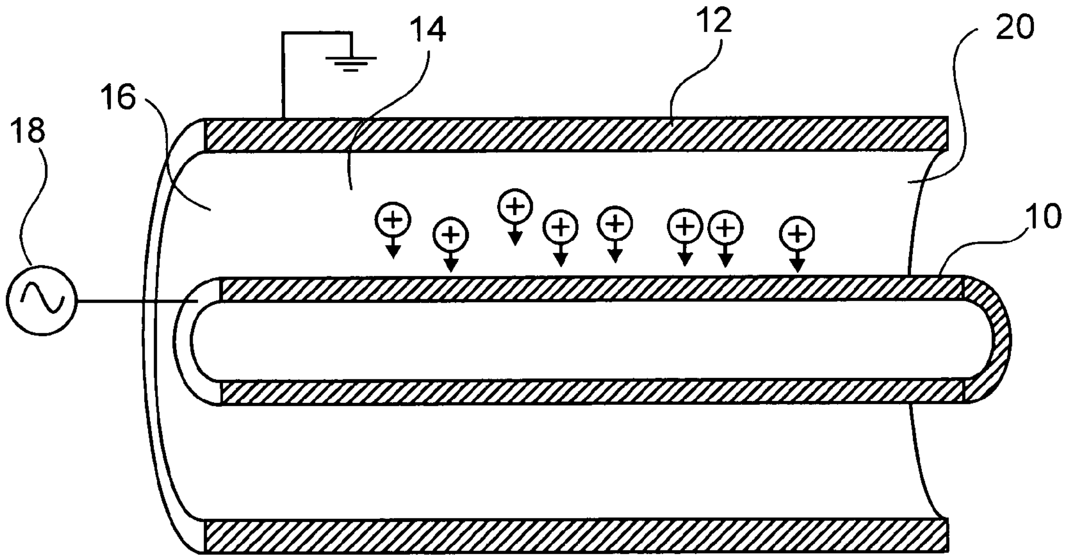
FIG. 1*d* shows the plurality of ions of FIG. 1*a* returning towards the focus region near the inner electrode.

Referring now to FIG. 1*d*, shown is the plurality of ions of FIG. 1*a* returning towards the focus region near the inner electrode 10. Since here the condition of applied voltages are identical to that which exists at FIG. 1*a*, the ions begin to return to the focus region near the inner electrode 10. The ions return more slowly than the outward motion that was described having regard to FIG. 1*b*, since the field is weak. Accordingly, the ions randomize in space, but ultimately will occupy the focus region.

Figure 1E:
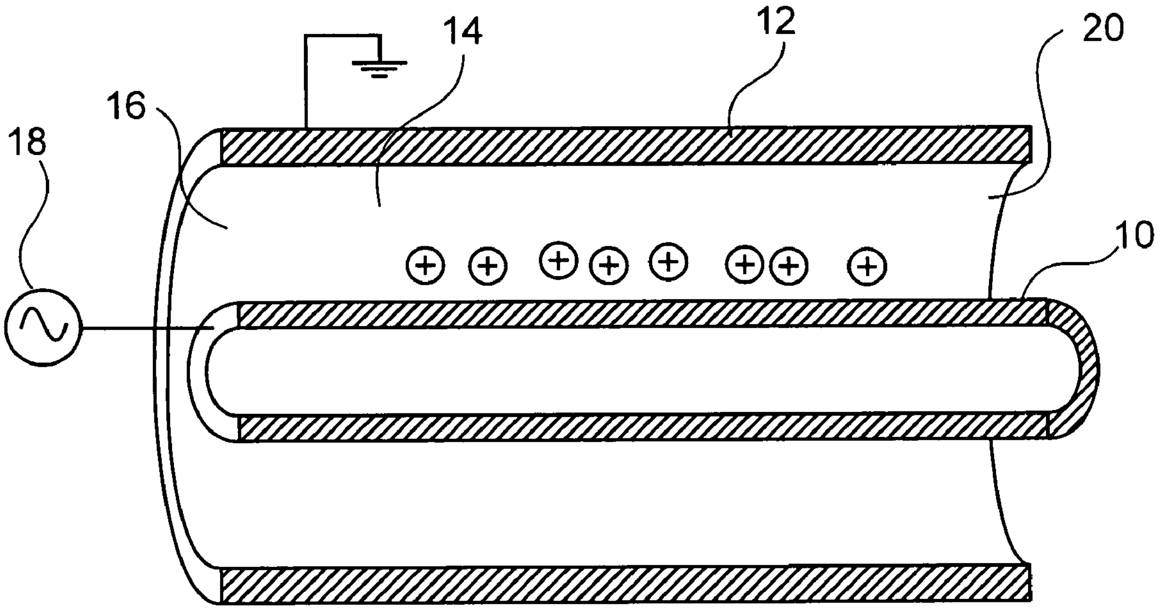
FIG. 1*e* shows the plurality of ions of FIG. 1*a* within the focus region near the inner electrode of the cylindrical geometry FAIMS.

Referring now to FIG. 1*e*, shown is the plurality of ions of FIG. 1*a* within the focus region near the inner electrode 10 of the cylindrical geometry FAIMS. In fact, the ions have returned to the focus region and the radial distribution is removed by the focusing effect. The ions are in a state similar to the one shown at FIG. 1*a*.

Optionally, the process that is described with reference to FIGS. 1*a*–1*e* is repeated one or more times. Repetition of the process is performed so as to remove incrementally more and more of the ions having drift mobilities higher than that of the ions that are illustrated at FIGS. 1*a*–1*e*.

FIGS. 1*a*–1*e* illustrate the basic principles that are exploited in order to separate ions using a combined FAIMS and DTIMS approach according to embodiments of the instant invention. Additional details and several preferred embodiments are presented in greater detail, below.

Figure 2:
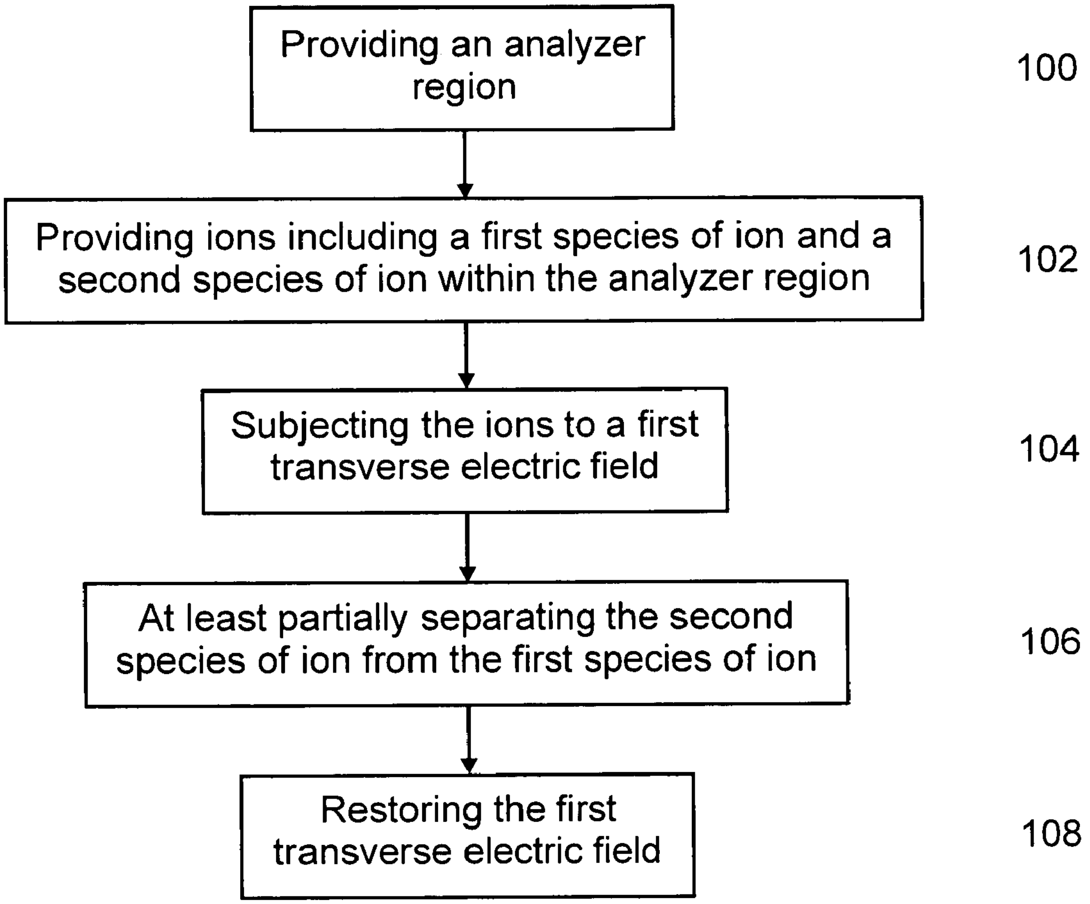
FIG. 2 is a simplified flow diagram of a method according to a first embodiment of the instant invention.

Referring now to FIG. 2, shown is a simplified flow diagram of a method according to a first embodiment of the instant invention. In particular, FIG. 2 shows a method of separating ions, including a first species of ion and a second species of ion that are transmitted through an analyzer region under substantially identical electrical field conditions of asymmetric waveform and compensation voltage (i.e. a pair of ions with very similar (or identical values) of $K_H/K$ for the conditions used in this experiment). At step 100 an analyzer region is provided. For instance, the analyzer region is defined by a space between a first electrode surface and a second electrode surface and has a length that is defined between an ion origin end and an ion detection end. Since the instant method relies upon ion focusing within the analyzer region, a portion of at least one of the first electrode surface and the second electrode surface is shaped to give rise to electric fields that vary in strength in the space in regions juxtaposed to the surfaces of the electrodes, for example curved or have some suitable non-planar shape. Several non-limiting examples of suitable electrode geometries for defining the analyzer region include a concentric cylinder electrode geometry, a curved parallel plate electrode geometry, a spherical electrode geometry, etc. One of ordinary skill in the art will readily envisage other suitable electrode geometries. At step 102, ions including a first species of ion and a second species of ion are provided within the analyzer region. The ions may also include other species of ions, at least some of which are separable from the first species of ions and from the second species of ions using only the FAIMS approach.

At step 104, the ions including the first species of ion and the second species of ion are subjected to a first transverse electric field. For instance, the first transverse electric field results from the application of an asymmetric waveform potential to one of the first electrode surface and the second electrode surface, and from the application of a direct current potential between the first electrode surface and the second electrode surface. A non-limiting example of suitable asymmetric waveform potential and direct current potential values is +4000 V and −5 V, respectively. Absent further steps in this method, the first species of ions and the second species of ions are not separated from each other. At step 106 the second species of ion is at least partially separated from the first species of ion by application of a second transverse electric field, for example by changing at least one of a magnitude and a polarity of the direct current potential. For instance, a direct current offset voltage of +200 V is applied between the first electrode surface and the second electrode surface, to effect a drifting motion of the first species of ion and the second species of ion in a direction substantially toward one of the first electrode surface and the second electrode surface. The species of ion having the highest absolute low field ion mobility, such as for example the second species of ion, moves the farthest and is preferentially collided with the one of the first electrode surface and the second electrode surface. Collision with an electrode surface neutralizes an ion and effectively removes it from the analyzer region. At step 108, the first transverse electric field is restored. For instance, the first transverse electric field is restored by setting the asymmetric waveform potential and direct current potential values back to their initial values, in this case +4000 V and −5 V, respectively. Preferably, the first transverse electric field is restored prior to the first species of ion colliding with the one of the first electrode surface and the second electrode surface. Under the restored first transverse field conditions, the first species of ion is substantially retained within the analyzer region. Improved ion separation may be achieved by repeating steps 104 through 108 at least one additional time.

Optionally, the direct current offset voltage is changed by only a small amount. For instance, at step 106 the direct current potential is changed from −5 V to −6 V. Since the effect of such a small change is to induce ions to drift slowly in a direction generally toward one of the first electrode surface and the second electrode surface, it is envisaged that step 106 is performed for a relatively longer period of time when a small change to the direct current potential is made. For instance, 5 ms may be required to achieve desired ion separation when the direct current potential is changed from −5 V to −6 V, whereas only 50 microseconds may be required to achieve desired ion separation when the direct current potential is changed from −5 V to +200 V. Of course, the actual duration of step 106 will depend upon a number of other factors in addition to the change in direct current potential. It is disadvantage of a small step of direct current offset voltage lasting for longer times that the ion cloud may have sufficient time to widen through diffusion and ion-ion mutual repulsion. It is a further disadvantage that the ion focus point may remain within the analyzer, and the ions may remain in equilibrium within the focus point. For example, if the two types of ions both occupy the same focus region at a direct current potential of −5 V and the focus region of the two ions remains within the analyzer region and both are shifted to a new radial location at a direct current potential of −6 V, separation may not take place. The magnitude, slew rate to final voltage, and duration time of direct current offset voltage application is dependent on factors including (as some non-limiting examples) the difference in the low field mobilities of the ions being separated, the strength of focusing of these types of ions, and the radial location of the focus of the ions before application of the direct current offset voltage.

Further optionally, the direct current potential is changed initially at step 108 to a value other than the initial value. For instance, the direct current potential is changed initially to −210 V in order to rapidly move the ions within the analyzer region away from the one of the first electrode surface and the second electrode surface and in a direction toward the other one of the first electrode surface and the second electrode surface. Once the ions have been returned close to their initial position radially within the analyzer region, the direct current potential is changed finally to its initial value, in this case −5 V, such that ion focussing occurs. Advantageously, rapidly moving the ions away from the one of the first electrode surface and the second electrode surface as described above limits the amount of radial expansion of the ion distribution that could occur as a result of diffusion and space charge ion-ion repulsion effects.

Figure 3:
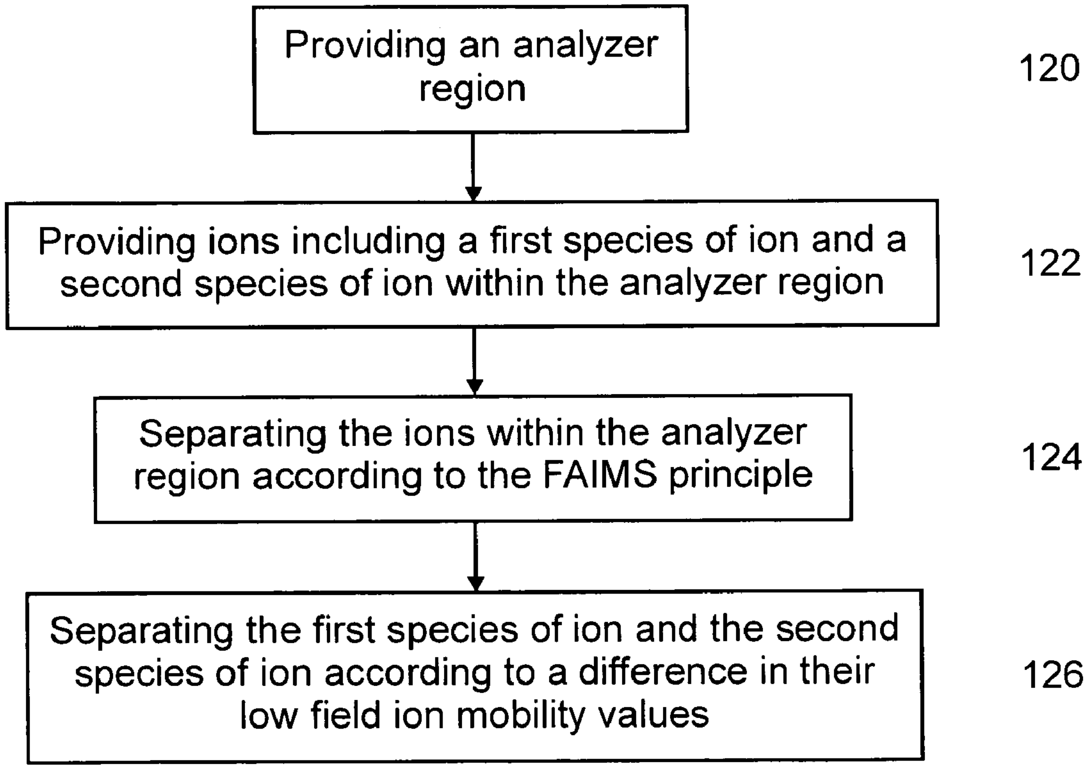
FIG. 3 is a simplified flow diagram of a method according to a second embodiment of the instant invention.

Referring now to FIG. 3, shown is a simplified flow diagram of a method according to a second embodiment of the instant invention. In particular, FIG. 3 shows a method of separating ions, including a first species of ion and a second species of ion that are transmitted through an analyzer region under substantially identical electrical field conditions of applied high frequency asymmetric waveform and compensation voltage. At step 120 an analyzer region is provided. For instance, the analyzer region is defined by a space between a first electrode surface and a second electrode surface and has a length that is defined between an ion origin end and an ion detection end. Since the instant method relies upon ion focusing within the analyzer region, a portion of at least one of the first electrode surface and the second electrode surface is shaped to give rise to electric fields that vary in strength in the space in regions adjacent to the surfaces of the electrodes. Several non-limiting examples of suitable electrode geometries for defining the analyzer region include concentric cylinder electrode geometry, a curved parallel plate electrode geometry, a spherical electrode geometry, edges of plate electrodes, etc. One of ordinary skill in the art will readily envisage other suitable electrode geometries. At step 122, ions including a first species of ion and a second species of ion are provided within the analyzer region. The ions may also include other species of ions, at least some of which are separable from the first species of ions and from the second species of ions using only the FAIMS approach.

At step 124, the ions are separated within the analyzer region according to the FAIMS principle. For instance, an electric field is provided within the analyzer region by the application of an asymmetric waveform potential to one of the first electrode surface and the second electrode surface, and from the application of an initial direct current potential between the first electrode surface and the second electrode surface. A non-limiting example of suitable asymmetric waveform potential and initial direct current potential values is +4000 V and −5 V, respectively. Under the influence of the electric field, some species of the ions move toward one of the electrodes and are lost from the analyzer region, whilst other species of ions become focused in the analyzer between the first and second electrodes. For instance, the first species of ion and the second species of ion are, in the instant example, both focused between the inner electrode and outer electrode for the given combination of asymmetric waveform potential and initial direct current potential of +4000 V and −5 V, respectively. Under the influence of an optional flow of a carrier gas, the first species of ion and the second species of ion are selectively transmitted along a time-averaged first direction through the analyzer region between the ion origin end and the ion detection end. Since each one of the first species of ion and the second species of ion are focused at a same combination of asymmetric waveform potential and direct current potential, it may not be possible to achieve further separation of the ions using FAIMS alone.

At step 126, the first species of ion and the second species of ion within the analyzer region are separated according to a difference in their low field ion mobility values, such that relatively more of one of the first species of ion and the second species of ion is transmitted to the ion detection end than is transmitted absent separating the first species of ion and the second species of ion within the analyzer region according to a difference in their low field ion mobility values. For instance, step 126 is performed by changing at least one of a magnitude and a polarity of the direct current potential. For instance, the initial direct current offset voltage is replaced by a first temporary direct current offset voltage of +200 V applied between the first electrode surface and the second electrode surface, to effect a drifting motion of the first species of ion and the second species of ion in a direction substantially toward one of the first electrode surface and the second electrode surface. The species of ion having the highest absolute low field ion mobility, such as for example the second species of ion, moves the farthest and is preferentially collided with the one of the first electrode surface and the second electrode surface. Collision with an electrode surface neutralizes an ion and effectively removes it from the analyzer region. Then, prior to the first species of ion colliding with the one of the first electrode surface and the second electrode surface, the first temporary direct current potential is changed back to the initial direct current potential, in this case −5 V. The first species of ion is then substantially retained within the analyzer region. Improved ion separation may be achieved by repeating step 126 at least one additional time.

Optionally, the difference between the initial and the first temporary direct current offset voltage is only a small voltage. For instance, at step 126 the direct current potential is changed from −5 V to −6 V. Since the effect of such a small change is to induce ions to drift slowly in a direction generally toward one of the first electrode surface and the second electrode surface, it is envisaged that step 126 is performed for a relatively longer period of time when a small change to the direct current potential is made. For instance, 5 ms may be required to achieve desired ion separation when the direct current potential is changed from −5 V to −6 V, whereas only 50 microseconds may be required to achieve desired ion separation when the direct current potential is changed from −5 V to +200 V. Of course, the actual duration of step 126 will depend upon a number of other factors in addition to the change in direct current potential.

Further optionally, the first temporary direct current potential is changed after completion of a first selected period of time to a second temporary direct current potential value other than the initial direct current potential. For instance, the first temporary direct current potential is replaced by a second temporary direct current potential of −210 V in order to rapidly move the ions within the analyzer region away from the one of the first electrode surface and the second electrode surface and in a direction toward the other one of the first electrode surface and the second electrode surface. Once the ions have been returned close to their initial position radially within the analyzer region, the second temporary direct current potential is changed finally to the initial direct current potential, in this case −5 V, such that ion focussing occurs. The first species of ion is then substantially retained within the analyzer region. Advantageously, rapidly moving the ions away from the one of the first electrode surface and the second electrode surface as described above limits the amount of radial distribution of the ions that could occur as a result of diffusion and space charge effects.

Figure 4:
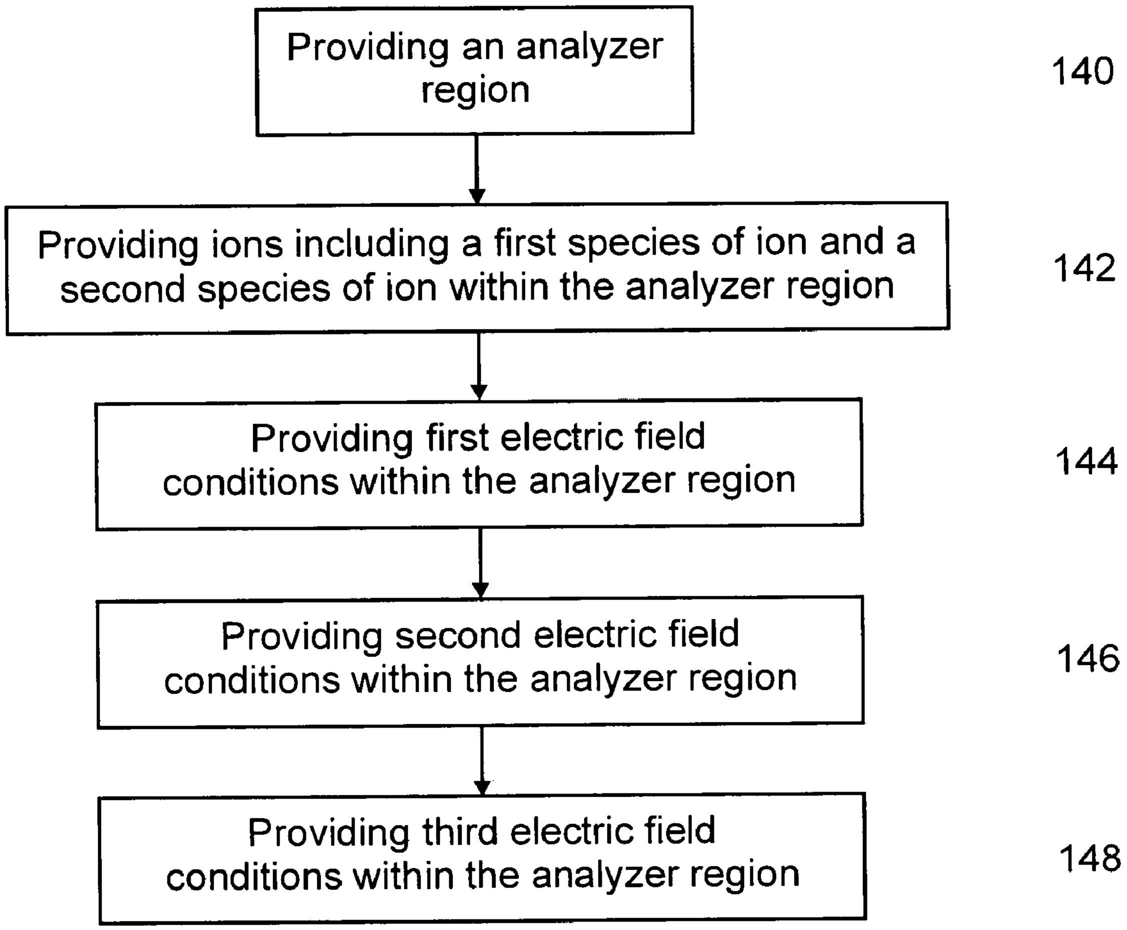
FIG. 4 is a simplified flow diagram of a method according to a third embodiment of the instant invention

Referring to FIG. 4, shown is a simplified flow diagram of a method according to a third embodiment of the instant invention. In particular, FIG. 4 shows a method of separating ions, including a first species of ion and a second species of ion that are transmitted through an analyzer region under substantially identical electrical field conditions of applied high frequency asymmetric waveform and direct current compensation voltage. At step 140 an analyzer region is provided. For instance, the analyzer region is defined by a space between a first electrode surface and a second electrode surface and has a length that is defined between an ion origin end and an ion detection end. Since the instant method relies upon ion focusing within the analyzer region, a portion of at least one of the first electrode surface and the second electrode surface is shaped to form electric field gradients in the regions among the electrodes. Several non-limiting examples of suitable electrode geometries for defining the analyzer region include concentric cylinder electrode geometry, a curved parallel plate electrode geometry, a spherical electrode geometry, edges of parallel plates, etc. One of ordinary skill in the art will readily envisage other suitable electrode geometries. At step 142, ions including a first species of ion and a second species of ion are provided within the analyzer region. The ions may also include other species of ions, at least some of which are separable from the first species of ion and from the second species of ion using only the FAIMS approach.

At step 144, first electric field conditions are provided within the analyzer region. The first electric field conditions are selected for substantially retaining the first species of ion within the analyzer region, by the application of an asymmetric waveform potential to one of the first electrode surface and the second electrode surface, and by the application of a first direct current potential (compensation voltage) between the first electrode surface and the second electrode surface. A non-limiting example of suitable asymmetric waveform potential and direct current potential values is +4000 V and −5 V, respectively. Under the influence of the electric field, some species of the ions move toward one of the electrodes and are lost from the analyzer region, whilst other species of ions become focused in the space between first electrode and the second electrode. For instance, the first species of ion and the second species of ion are, in the instant example, both focused near the inner electrode of a cylindrical geometry FAIMS for the given combination of asymmetric waveform potential and direct current potential of +4000 V and −5 V, respectively. Under the influence of a flow of an optional carrier gas, the first species of ion and the second species of ion are selectively transmitted along a time-averaged first direction through the analyzer region between the ion origin end and the ion detection end. Since each one of the first species of ion and the second species of ion are focused at a same combination of asymmetric waveform potential and direct current potential, it is not possible to achieve further separation of the ions using FAIMS alone.

At step 146, second electric field conditions are provided for preferentially colliding the second species of ion with one of the first electrode surface and the second electrode surface. For example, the second electric field conditions are provided by the application of the asymmetric waveform potential to the one of the first electrode surface and the second electrode surface, and by the application of a second direct current potential between the first electrode surface and the second electrode surface. For instance, the second direct current potential has at least one of a polarity and a magnitude that is different compared to that of the first direct current potential. For instance, a direct current offset voltage of +200 V is applied between the first electrode surface and the second electrode surface, to effect a drifting motion of the first species of ion and the second species of ion in a direction substantially toward one of the first electrode surface and the second electrode surface. The species of ion having the highest absolute low field ion mobility, such as for example the second species of ion, moves the farthest and is preferentially collided with the one of the first electrode surface and the second electrode surface. Collision with an electrode surface neutralizes an ion and effectively removes it from the analyzer region.

At step 148, third electric field conditions are provided within the analyzer region. For instance, prior to the first species of ion colliding with the one of the first electrode surface and the second electrode surface, the direct current potential is changed back to its initial value, in this case −5 V. The first species of ion is then substantially retained within the analyzer region. Improved ion separation may be achieved by repeating steps 146 through 148 at least one additional time.

Optionally, the direct current offset voltage is changed by only a small amount. For instance, at step 146 the direct current potential is changed from −5 V to −6 V. Since the effect of such a small change is to induce ions to drift slowly in a direction generally toward one of the first electrode surface and the second electrode surface, it is envisaged that step 146 is performed for a relatively longer period of time when a small change to the direct current potential is made. For instance, 5 ms may be required to achieve desired ion separation when the direct current potential is changed from −5 V to −6 V, whereas only 50 microseconds may be required to achieve desired ion separation when the direct current potential is changed from −5 V to +200 V. Of course, the actual duration of step 146 will depend upon a number of other factors in addition to the change in direct current potential.

Further optionally, the direct current potential is changed from the first value to a second value other than its initial value. For instance, the direct current potential is changed from a first value of +200 V to a second value of −210 V in order to rapidly move the ions within the analyzer region away from the one of the first electrode surface and the second electrode surface and in a direction toward the other one of the first electrode surface and the second electrode surface. Once the ions have been returned close to their initial position radially within the analyzer region, the direct current potential is changed finally to its initial value, in this case −5 V, such that ion focussing occurs. Advantageously, rapidly moving the ions toward the one of the first electrode surface and the second electrode surface as described above, and rapidly moving them back to the initial radial location limits the amount of radial distribution of the ions that can occur as a result of diffusion and space charge ion-ion repulsion effects.

Steps 144 to 148 described above are performed sequentially during a period of time that is shorter than the time that is required for an ion to traverse the length of the analyzer region under a given set of operating conditions.

Several non-limiting examples are discussed below for the purpose of illustrating the various features and principles of some of the embodiments of the instant invention. All specific numerical values (including voltages and time periods) are given by way of example only, and are not intended in any way to be limiting. It is also to be understood that when different species of ions are described as being focused to a same "focus region," what is meant is that ions of the different species cannot practically be separated one from the other on the basis of differences in their high field behavior, alone (i.e. both types of ions have nearly identical $K_H/K$ ratios). Furthermore, when different species of ions are described as being focused to different "focus regions," what is meant is that ions of the different species are distributed in space about different "focus regions" within the analyzer region, such that the ions of the different species cannot be completely separated, one species from the other, on the basis of differences in their high field behavior, alone (i.e. the two ions may have comparable but not identical $K_H/K$ ratios).

Figure 5A:
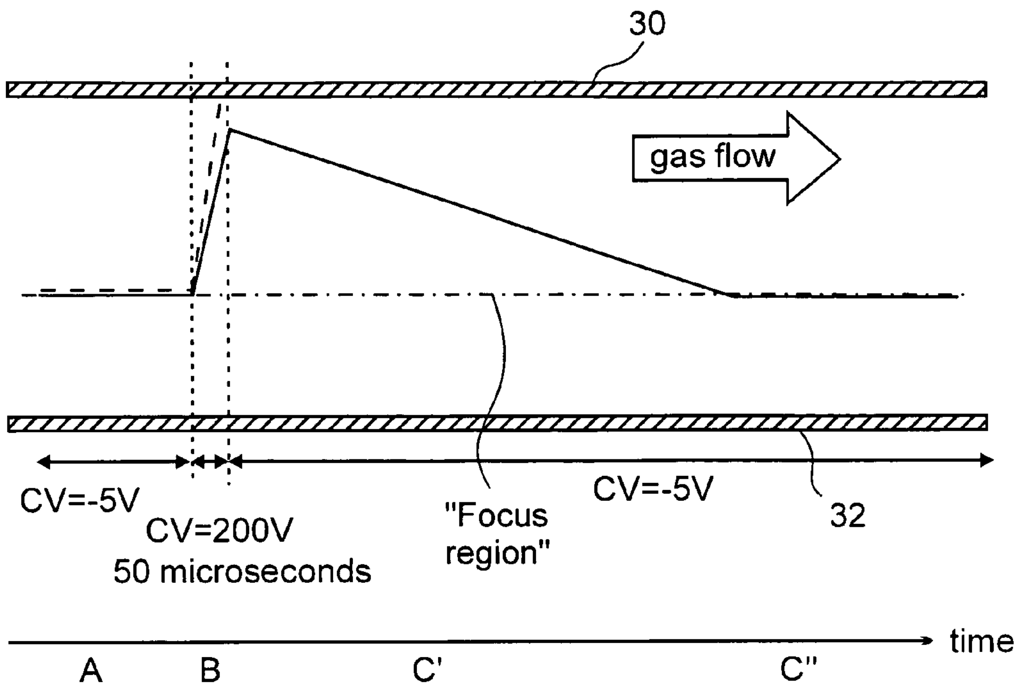
FIG. 5*a* shows simulated average ion trajectories of two species of ions within a FAIMS analyzer region during a combined FAIMS/DTIMS separation, which is performed in accordance with a method according to any one of the first, second and third embodiments of the instant invention.

Referring now to FIG. 5*a*, shown are simulated average ion trajectories of two species of ions within a FAIMS analyzer region during a combined FAIMS/DTIMS separation, which is performed in accordance with a method according to any one of the first, second and third embodiments of the instant invention. In FIG. 5*a* the asymmetric waveform voltage and the direct current (compensation) voltage is applied to electrode 32, which is the inner electrode of concentric arrangement of inner electrode 32 and outer electrode 30. In FIG. 5*a*, the average ion trajectory of a first species of ion is shown as a solid line, and the average ion trajectory of a second species of ion is shown as a dashed line. One of ordinary skill in the art will appreciate that a rapid oscillatory motion is also superimposed upon the average ion trajectory of the first and second species of ion, as a result of the applied asymmetric waveform potential. Accordingly, the simulated average ion trajectory represents the net motion of the first and second species of ion through the analyzer region. Furthermore, the time axis has not been drawn to scale.

Figure 5B:
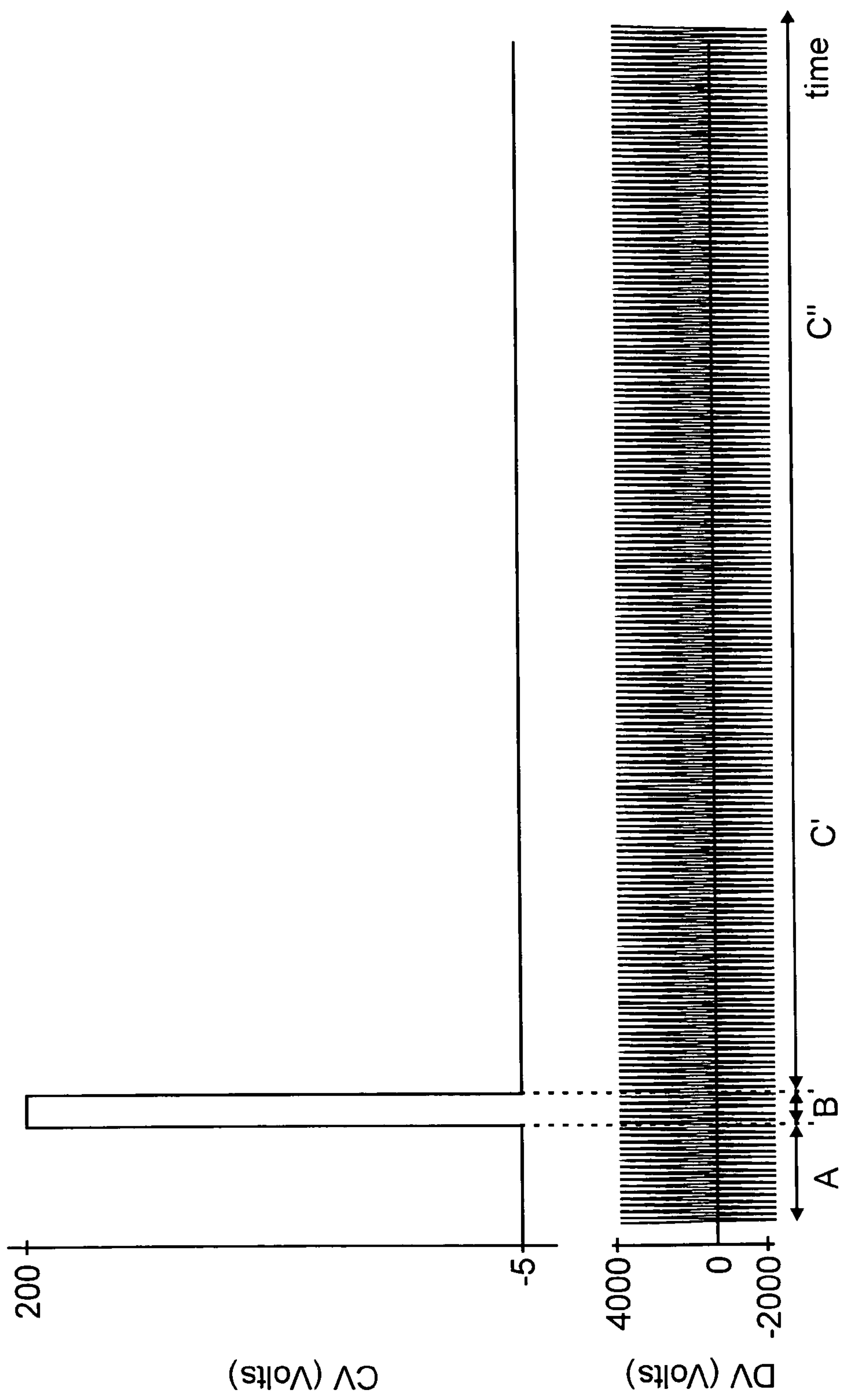
FIG. 5*b* shows plots of the direct current and asymmetric waveform potentials that are applied as a function of time during the combined FAIMS/DTIMS separation that is illustrated at FIG. 5*a;*

Referring now to FIG. 5*b*, shown are plots of the direct current potential (upper plot) and the asymmetric waveform potential (lower plot) that are applied as a function of time during the combined FAIMS/DTIMS separation that is illustrated at FIG. 5*a*. The times A, B, C' and C" shown along the bottom of FIG. 5*b* correspond to the times A, B, C' and C" that are shown along the bottom of FIG. 5*a*.

Referring again to FIG. 5*a*, during a period of time A the first and second species of ion are focused to a "focus region" that is indicated by the dash-dot line between the two FAIMS electrodes 30 and 32. The dash-dot line is shown in this figure merely to indicate the "focus region" to which the ions are focused under conditions of CV=−5V. Accordingly, when the CV is changed to +200V, it is apparent that the ions move in a direction that is away from their initial location between the electrodes 30 and 32. One of skill in the art will understand that the ions are not actually focused to the "focus region" when CV=+200V is applied between the electrodes. Furthermore, in practice, both the first and second species of ion are actually spread out to either side of the "focus region" due to diffusion and space charge ion-ion mutual repulsion. Since the first and second species of ion exhibit virtually identical high field behavior, and are focused to a same "focus region," it is not apparent how to separate the first species of ion and the second species of ion using FAIMS alone.

During time B, the first and second species of ions are separated on the basis of differences in their low field ion mobility values. As shown at FIG. 5*b*, the direct current potential is increased from −5 V to +200 V during time B, which in this example has a duration of 50 microseconds. Referring again to FIG. 5*a*, both the first and second species of ion move rapidly in a direction toward the FAIMS electrode 30. The species of ion having the highest low field ion mobility value, in this example the second species of ion with average motion shown by a dashed line, moves more quickly toward the FAIMS electrode 30 compared to the species of ion having the lowest low field ion mobility value, in this example the first species of ion with average motion shown as a solid line. Accordingly, under electrical field conditions during time B, the second species of ion requires a shorter period of time to arrive at, and collide with, the FAIMS electrode 30. Of course, time period B is selected to end prior to the first species of ion arriving at, and colliding with, the FAIMS electrode 30. During time C, the first species of ion and any remaining ions of the second species of ion move slowly in a direction away from the FAIMS electrode 30. As shown at FIG. 5*b*, the direct current potential is decreased from +200 V to −5 V during time C. Referring again to FIG. 5*a*, the time C has been divided into times C' and C" in order to facilitate discussion. The direct current potential and the asymmetric waveform potential that is applied during time C' is identical to the direct current potential and the asymmetric waveform potential that is applied during time C". However, during time C' the ions drift slowly back towards the focus region, becoming more spread out as a result of diffusion and space charge repulsion. During time C" the ions have returned to the "focus region," and the original narrow radial spacing of the ions is restored.

Optionally, the first species of ion are detected during time C". Preferably, the applied direct current potential and asymmetric waveform potential are maintained at constant values during time C", in this example −5 V and +4000 V, respectively, such that the first species of ion is maintained within the analyzer region prior to detection. Advantageously, the ions that are detected are enriched in the first species of ion relative to the second species of ion, as a result of the additional separation based upon the low field ion mobility values. Optionally, the ions are collected, detected or processed otherwise.

Figure 6A:
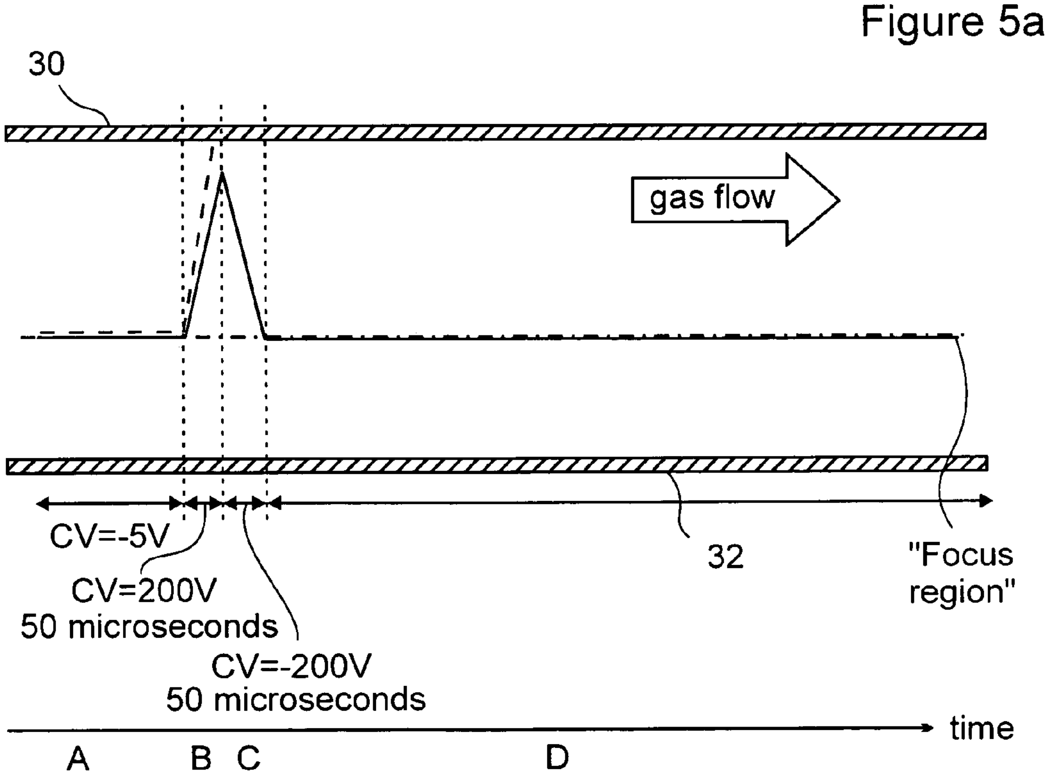
FIG. 6*a* shows simulated average ion trajectories of two species of ions within a FAIMS analyzer region during a combined FAIMS/DTIMS separation, which is performed in accordance with a method according to any one of the first, second and third embodiments of the instant invention.

Referring now to FIG. 6*a*, shown are simulated average ion trajectories of two species of ions within a FAIMS analyzer region during a combined FAIMS/DTIMS separation, which is performed in accordance with a method according to any one of the first, second and third embodiments of the instant invention. In FIG. 6*a*, the simulated average ion trajectory of a first species of ion is shown as a solid line, and the simulated average ion trajectory of a second species of ion is shown as a dashed line. One of ordinary skill in the art will appreciate that a rapid oscillatory motion is also superimposed upon the average ion trajectory of the first and second species of ion, as a result of the applied asymmetric waveform. Accordingly, the simulated average ion trajectory represents the net motion of the first and second species of ion through the analyzer region. Furthermore, the time axis has not been drawn to scale.

Figure 6B:
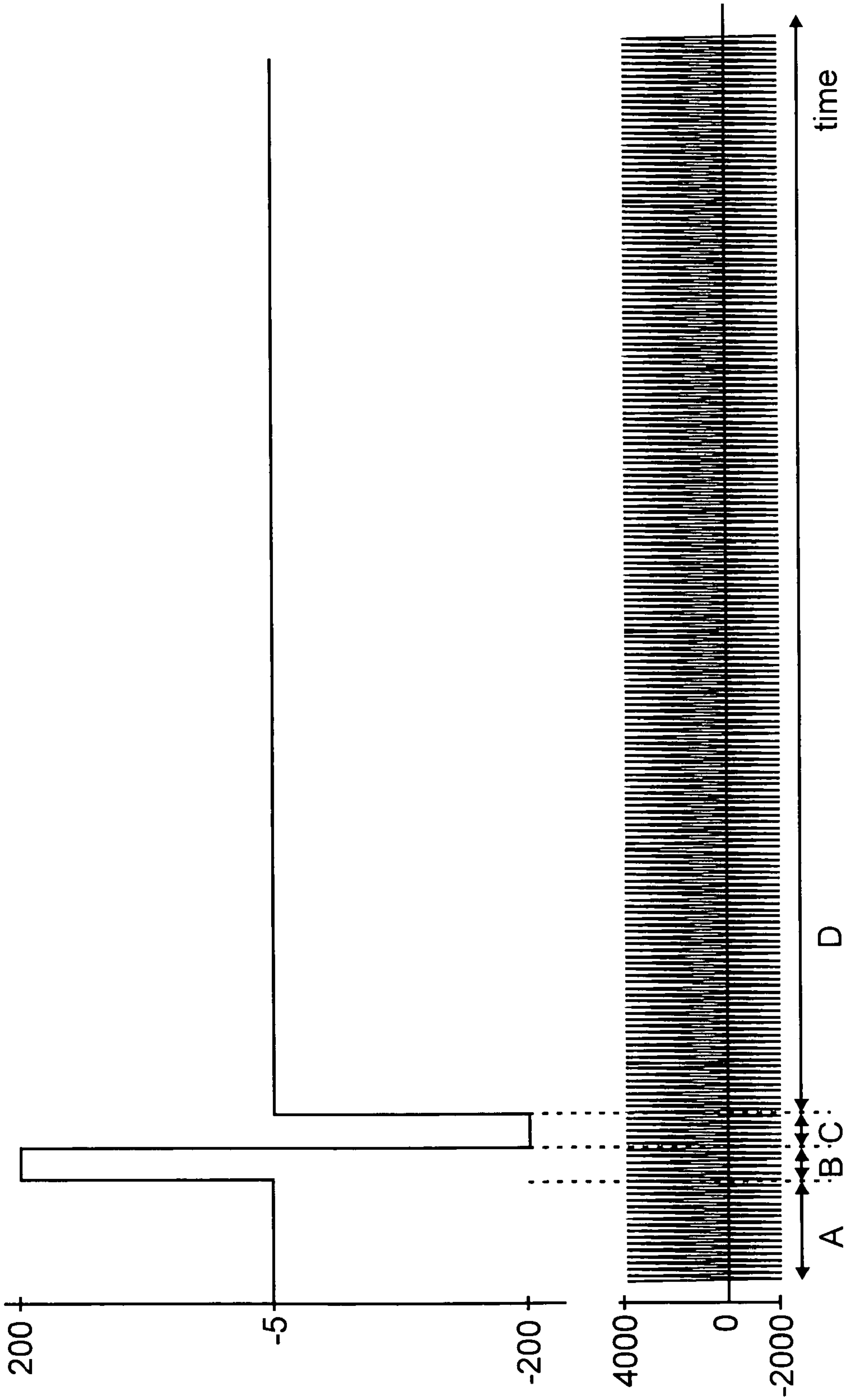
FIG. 6*b* shows plots of the direct current and asymmetric waveform potentials that are applied as a function of time during the combined FAIMS/DTIMS separation that is illustrated at FIG. 6*a;*

Referring now to FIG. 6*b*, shown are plots of the direct current potential (upper plot) and the asymmetric waveform potential (lower plot) that are applied as a function of time during the combined FAIMS/DTIMS separation that is illustrated at FIG. 6*a*. The times A, B, C and D shown along the bottom of FIG. 6*b* correspond to the times A, B, C and D that are shown along the bottom of FIG. 6*a*.

Referring again to FIG. 6*a*, during a period of time A the first and second species of ion are focused to a "focus region" that is indicated by the dash-dot line between the two FAIMS electrodes 30 and 32. The dash-dot line is shown in this figure merely to indicate the "focus region" to which the ions are focused under conditions of CV=−5V. Accordingly, when the CV is changed to +200V or −200V, it is apparent that the ions move in a direction that is respectively away from or toward their initial location between the electrodes 30 and 32. One of skill in the art will understand that the ions are not actually focused to the "focus region" when CV=+200V is applied between the electrodes. Furthermore, in practice, both the first and second species of ion are actually spread out to either side of the "focus region" due to diffusion and space charge repulsion. Since the first and second species of ion exhibit virtually identical high field behavior, and are focused to a same "focus region," it is not apparent how to separate the first species of ion and the second species of ion using FAIMS alone.

During time B, the first and second species of ions are separated on the basis of differences in their low field ion mobility values. As shown at FIG. 6*b*, the direct current potential is increased from −5 V to +200 V for the duration of time B, which in this case has a duration of 50 microseconds. Referring again to FIG. 6*a*, both species of ion move rapidly in a direction toward the FAIMS electrode 30. The species of ion having the highest low field ion mobility value, in this example the second species of ion, moves more quickly toward the FAIMS electrode 30 compared to the species of ion having the lowest low field ion mobility value, in this example the first species of ion. Accordingly, under identical electrical field conditions during time B, the second species of ions requires a shorter period of time to arrive at and collide with the FAIMS electrode 30. Of course, time B is selected to end prior to the first species of ion arriving at and colliding with the FAIMS electrode 30. During time C, the first species of ion and any remaining ions of the second species of ion move rapidly in a direction away from the FAIMS electrode 30. As shown at FIG. 6*b*, the direct current potential is changed from +200 V to −210 V during time C, which in this case lasts for a duration of 50 microseconds. During time D the ions have returned to the "focus region."

Advantageously, moving the ions rapidly, first in a direction toward the FAIMS electrode 30 and second in a direction away from the FAIMS electrode 30, preserves the original narrow radial spacing of the ions. Stated differently, there is less time for the effects of diffusion and space-charge ion-ion mutual repulsion to cause the ions to spread out when the direct current potential is changed as shown at FIG. 6*b* compared to when the direct current potential is changes as shown in FIG. 5*b*.

Figure 7A:
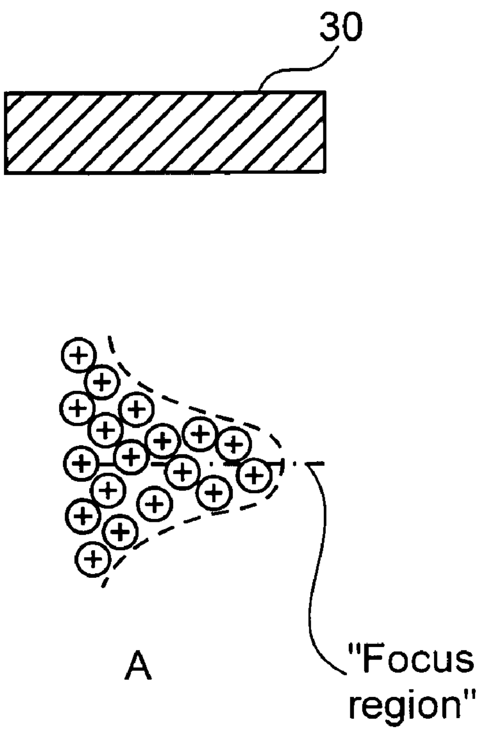
FIG. 7*a* shows a plurality of ions within a FAIMS analyzer region at time A of the combined FAIMS/DTIMS separation that is illustrated at FIG. 6*a;*

Referring now to FIG. 7*a*, shown is a plurality of ions within a FAIMS analyzer region at time A of the combined FAIMS/DTIMS separation that is illustrated at FIG. 6*a*. For improved clarity, only one electrode 30 of the two electrodes defining the analyzer region is shown at FIG. 7*a*. In addition, only ions of the second species of ion are shown. The ions of the second species of ion are shown as being spread out to either side of a "focus region" within the analyzer region. The dotted curved envelope surrounding the ions at FIG. 7*a* represents an approximate distribution of the focused ions. Accordingly, the number density of ions is assumed to be highest near the "focus region," and to decrease with increasing distance from the "focus region." It should also be noted that the first species of ion is not illustrated at FIG. 7*a*, but for the purpose of discussion they are assumed to be present and to display a similar shaped distribution about the same "focus region."

Figure 7B:
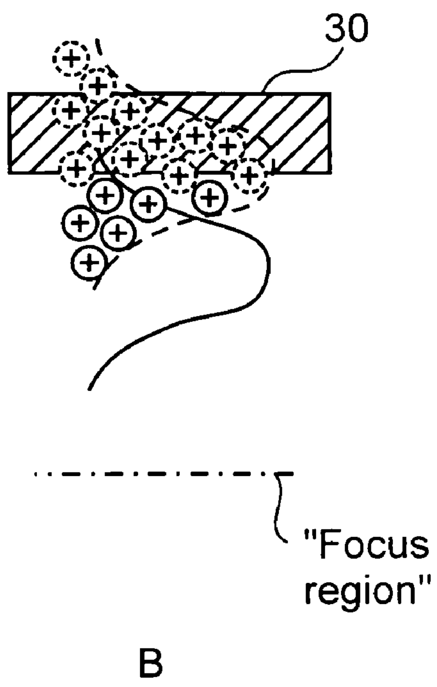
FIG. 7*b* shows a plurality of ions within a FAIMS analyzer region at time B of the combined FAIMS/DTIMS separation that is illustrated at FIG. 6*a;*

Referring now to FIG. 7*b*, shown is the plurality of ions within a FAIMS analyzer region at the end of time B of the combined FAIMS/DTIMS separation that is illustrated at FIG. 6*a*. The direct current offset voltage has been increased from −5 V to +200 V at the start of time B and held constant during time B. Accordingly, ions of the second species of ion have been moved rapidly toward the electrode 30, in such a manner that the distribution of ions shown at FIG. 7*a* is minimally changed. However, those ions that are shown with a dotted outline are understood to have been effectively removed from the analyzer region as a result of a collision with a surface of the electrode 30. The ions with a dotted outline are shown at FIG. 7*b* only to illustrate that the movement of the ions is rapid relative to diffusion and space charge repulsion induced movement of the ions. Also shown at FIG. 7*b* is a solid curved envelope representing the distribution of the first species of ions within the analyzer region. Ions of the first species of ion also moves rapidly toward the electrode 30 during time B, but since the low field mobility of the first species of ion is lower than that of the second species of ion, the first species of ion does not move as rapidly toward the electrode 30 as the second species of ion. Stated differently, by the end of time B the second species of ion collides with the electrode surface, whereas the first species of ion substantially avoids collision with the electrode surface.

Figure 7C:
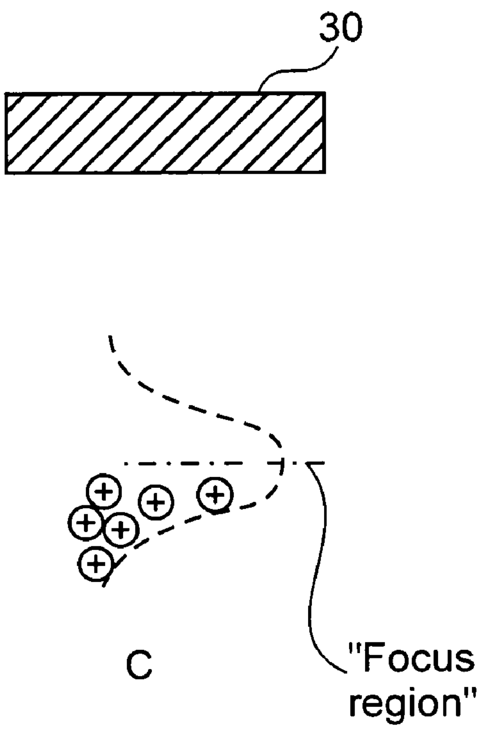
FIG. 7*c* shows a plurality of ions within a FAIMS analyzer region at time C of the combined FAIMS/DTIMS separation that is illustrated at FIG. 6*a;*

Referring now to FIG. 7*c*, shown is a plurality of ions within a FAIMS analyzer region at the end of time C of the combined FAIMS/DTIMS separation that is illustrated at FIG. 6*a*. During time C, a direct current offset voltage of −210 V is applied in order to rapidly move ions of the first species of ion, and any remaining ions of the second species of ion, back toward the focus region. As shown at FIG. 7*c*, the movement of the ions is rapid relative to the motion that is caused by diffusion and space-charge repulsion. At the end of time C, the ions are being focused, and are substantially retained within the analyzer region. Note, however, that significantly fewer ions of the second species of ion remain within the analyzer at time C compared to the number that is shown time A.

Referring again to FIG. 7*b*, the ion distribution of the first species at the end of time B is shown as a solid line. If the reversed polarity pulse shown as time C in FIG. 7*b* is not applied, the distribution shown as a solid line in FIG. 7*b* will broaden in time because of diffusion and ion-ion mutual repulsion. However, since the distribution shown by the solid line in FIG. 7*b* is proximate to the electrode 30 this broadening leads to loss of the first species of ions. It is beneficial to move this distribution away from the electrode 30 prior to a time delay. The distribution of the first ion after time C is not shown in FIG. 7*c*, however the distribution of the first ion will resemble the dashed line shown for the second ion. However, unlike the second ion, fewer of the first ion are lost by collision with electrode 30.

Figure 7D:
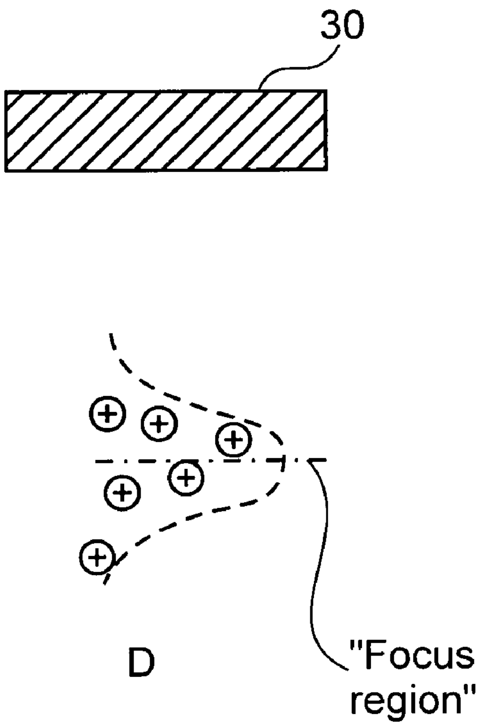
FIG. 7*d* shows a plurality of ions within a FAIMS analyzer region at time D of the combined FAIMS/DTIMS separation that is illustrated at FIG. 6*a;*

Referring now to FIG. 7*d*, shown is a plurality of ions within a FAIMS analyzer region at a later time during time D of the combined FAIMS/DTIMS separation that is illustrated at FIG. 6*a*. The ions continue to be focused at time D, and the effects of diffusion and space-charge repulsion cause the remaining ions to spread out more evenly on either side of the focus region. Similarly, the not illustrated first type of ion is also focused about the focus region at time D.

Advantageously, subsequent detection of the ions illustrated at FIG. 7*d* results in improved sensitivity with respect to the first species of ion, since the flow of ions provided from the analyzer region is enriched in the first species of ion relative to the second species of ion.

Figure 8:
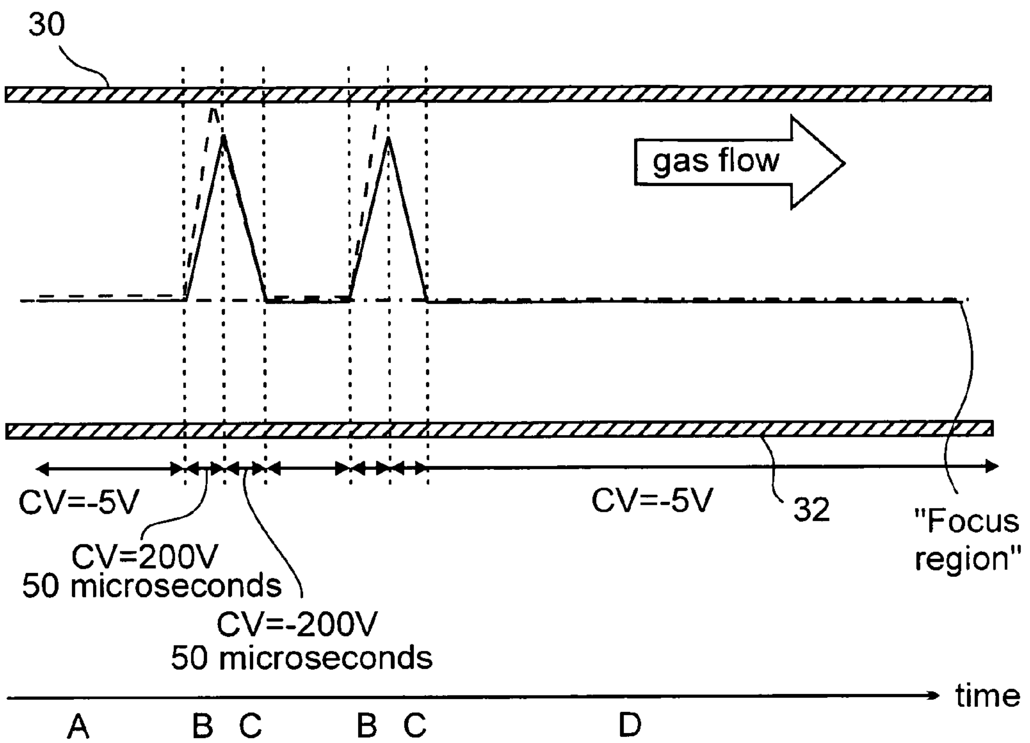
FIG. 8 shows simulated average ion trajectories of two species of ions within a FAIMS analyzer region during repeated cycles of the combined FAIMS/DTIMS separation that is illustrated at FIG. 6*a;*

Referring now to FIG. 8, shown are simulated average ion trajectories of two species of ions within a FAIMS analyzer region during repeated cycles of the combined FAIMS/DTIMS separation that is illustrated at FIG. 6*a*. Since some ions of the second species of ion remain after performing the separation that is illustrated at FIG. 6*a* one time, it is preferable to perform at least a second similar separation to further separate the second species of ions from the first species of ions. For instance, following time D in FIG. 8, after the ions have "redistributed" about the focus region, the direct current offset voltage is increased from −5 V to +200 V again so as to return the ions to the condition that is shown at FIG. 7*b*. In this manner, a portion of the remaining ions of the second species of ion may be removed by collision with the electrode surface. Then, the direct current offset voltage is changed to −210 V so as to return the remaining ions to the "focus region," and finally to −5 V so as to focus the ions prior to extraction and/or detection. Although two cycles are shown at FIG. 8, one of skill in the art will understand that any number of cycles may be performed to achieve a desired level of separation. Second and further cycles can be repeated at a frequency that allows time for the ions to be "redistributed" to their equilibrium distribution between the changes of the direct current offset voltages.

Figure 9A:
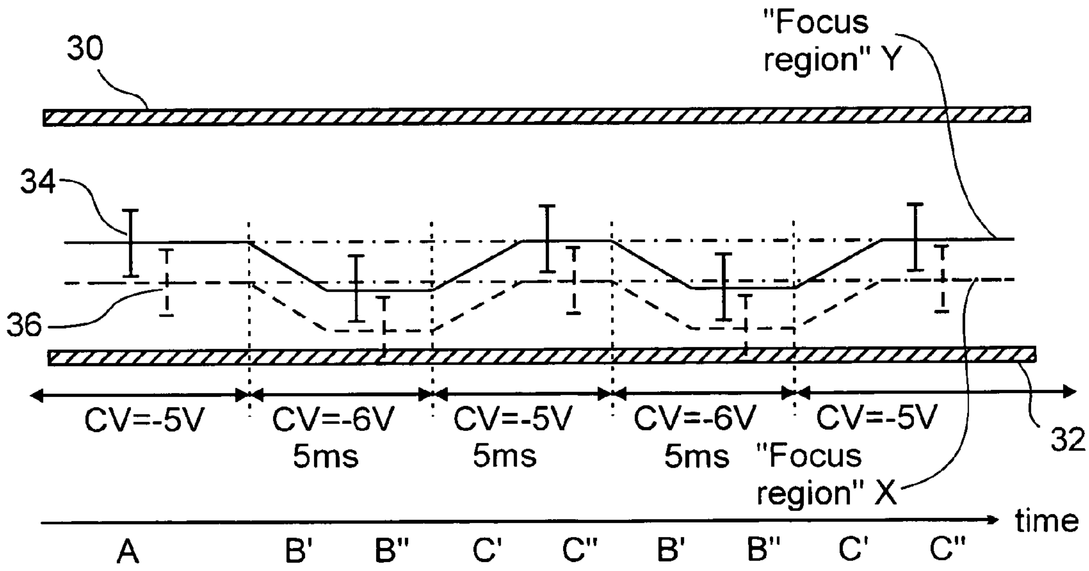
FIG. 9*a* shows simulated average ion trajectories of two species of ions, each species of ion being focused to a different focus region within a FAIMS analyzer region, during a FAIMS separation, which is performed in accordance with a method according to any one of the first, second and third embodiments of the instant invention.

Referring now to FIG. 9*a*, shown are simulated average ion trajectories of two species of ions, each species of ion being focused to a different "focus region" within a FAIMS analyzer region, during a separation performed in accordance with a method according to an embodiment of the instant invention. In FIG. 9*a*, the simulated average ion trajectory of a first species of ion is shown as a solid line, and the simulated average ion trajectory of a second species of ion is shown as a dashed line. One of ordinary skill in the art will appreciate that a rapid oscillatory motion is also superimposed upon the average ion trajectory of the first and second species of ion, as a result of the applied high-frequency asymmetric waveform. Accordingly, the simulated average ion trajectory represents the net motion of the first and second species of ion through the analyzer region. Furthermore, the time axis has not been drawn to scale.

In FIG. 9*a*, the first species of ion is focused to a first "focus region," Y, as indicated by a first dash-dot line, whilst the second species of ion is focused to a second "focus region," X, as indicated by a second dash-dot line. The dash-dot lines are shown in this figure merely to indicate the "focus regions" to which the ions are focused under conditions of CV=−5V. Accordingly, when the CV is changed to −6V, it is apparent that the ions move in a direction that is away from their initial location between the electrodes 30 and 32. One of skill in the art will understand that the ions are not actually focused to the "focus regions" when CV=−6V is applied between the electrodes. Furthermore, in this case, the first species of ion and the second species of ion are selectively transmitted through the analyzer region under slightly different optimum conditions of applied DV and CV, but in practice the difference may be too small to support separation of the first species of ion from the second species of ion on the basis of the FAIMS principle, alone.

Figure 9B:
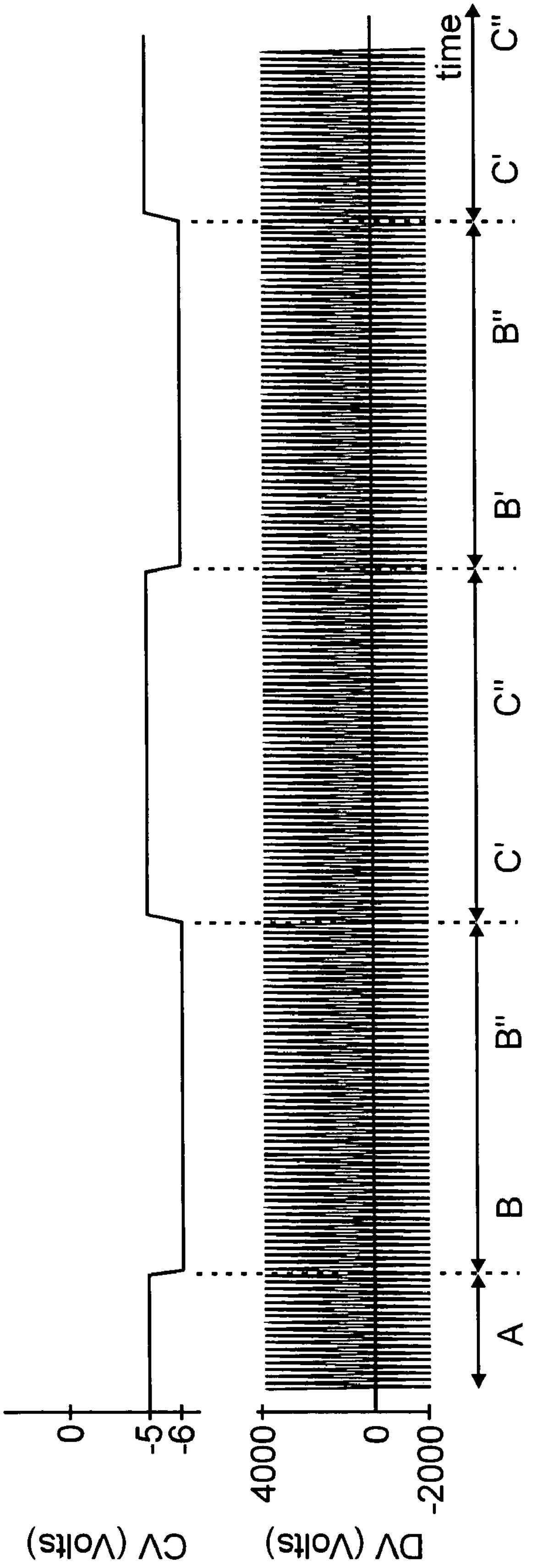
FIG. 9*b* shows plots of the direct current and asymmetric waveform potentials that are applied as a function of time during the FAIMS separation that is shown at FIG. 9*a;*

Referring now to FIG. 9*b*, shown are plots of the direct current potential (upper plot) and the asymmetric waveform potential (lower plot) that are applied as a function of time during the separation that is illustrated at FIG. 9*a*. The times A, B', B", C' and C" shown along the bottom of FIG. 9*b* correspond to the times A, B', B", C' and C" that are shown along the bottom of FIG. 9*a*.

Referring again to FIG. 9*a*, the first and second species of ion are focused during time A to a "focus region". Y, and to a "focus region" X, respectively, as indicated by the dash-dot lines between the two FAIMS electrodes 30 and 32. In practice, both the first and second species of ion are actually spread out to either side of the "focus region" Y and "focus region" X, respectively, due to diffusion and space charge repulsion. In FIG. 9*a* a solid vertical bar 34 indicates the distribution of the first type of ions around the focus point and a dashed vertical bar 36 indicates the distribution of the second type of ion. During the period of time A, the ions of the second species of ion are focused closer to the electrode 32 compared to the ions of the first species of ion.

As shown at FIG. 9*b*, the direct current potential is changed from −5 V to −6 V during time B' and B", which in this case has a total duration of 5 ms. The direct current potential and the asymmetric waveform potential that is applied during time B' is identical to the direct current potential and the asymmetric waveform potential that is applied during time B". Referring again to FIG. 9*a*, during B' both species of ion move slowly in a direction toward the FAIMS electrode 32. Effectively, the direct current potential of −6 V overcompensates the effect of the asymmetric waveform, thereby pushing the first and second species of ion away from the FAIMS electrode 30 and to the new location of the focus points for the first and second ions. Since the voltage was changed rapidly (FIG. 9*b*) whereas the ions move slowly toward the FAIMS electrode 32, diffusion and space charge repulsion causes some spreading of the ions. Under the electrical field conditions during time B', the second species of ions and the first species of ions are moved closer to the FAIMS electrode 32 whereas at time B" both ions are focused at equilibrium at the new locations (not denoted in the figure) defined by the magnitudes new value of direct current potential of −6 V. However the focus point of the second ion is sufficiently close to electrode 32 that the distribution indicated by the dashed vertical line 36 overlaps with electrode 32 such that some of the second species of ions collide with the FAIMS electrode 32. During time B" the ions remain in the focus region and the second ion is gradually lost to the wall of electrode 32. During time C', the first species of ion and any remaining ions of the second species of ion move slowly in a direction away from the FAIMS electrode 32. As shown at FIG. 9*b*, the direct current potential is changed from −6 V to −5 V during time C' and C". Referring again to FIG. 9*a*, the time C has been divided into times C' and C" in order to facilitate discussion. The direct current potential and the asymmetric waveform potential that is applied during time C' is identical to the direct current potential and the asymmetric waveform potential that is applied during time C". However, during time C' the ions are drifting slowly back towards the focus region. During time C" the ions have returned to the "focus region."

Since only those ions of the second species of ion that are located along the edge of the distribution of the second species of ion collide with the FAIMS electrode 32, each cycle of the steps described above removes an incremental number of the second species of ion. Accordingly, it is desirable to modulate the CV, so as to repeatedly move the ions toward the FAIMS electrode 32, thereby removing the ions of the second species of ion in a step-wise manner.

Optionally, the first species of ion are detected during time C". Preferably, the applied direct current potential and asymmetric waveform potential are maintained at constant values, in this example −5 V and +4000 V, respectively, such that the first species of ion is maintained within the analyzer region. Advantageously, the ions that are detected are enriched in the first species of ion relative to the second species of ion.

Figure 10A:
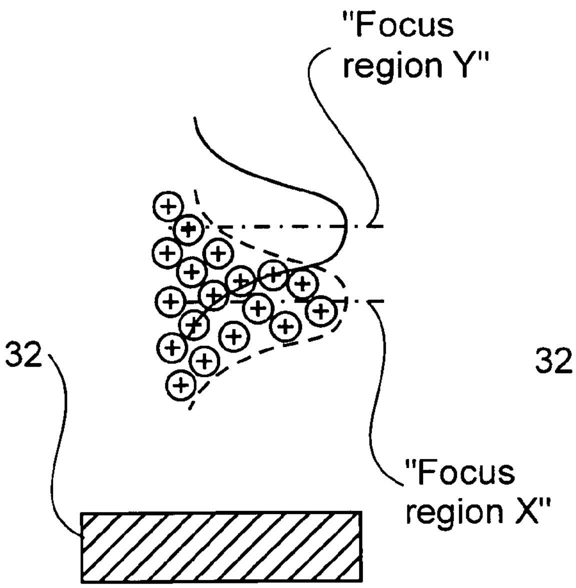
FIG. 10*a* shows a plurality of one of the species of ions of FIG. 9*a* within a FAIMS analyzer region, at time A of the FAIMS separation that is illustrated at FIG. 9*a;*

Referring now to FIG. 10*a*, shown is a plurality of one of the species of ions of FIG. 9*a* within a FAIMS analyzer region, at time A of the separation that is illustrated at FIG. 9*a*. For improved clarity, only one electrode 32 of the two electrodes defining the analyzer region is shown at FIG. 10*a*. In addition, only ions of the second species of ion are shown. The ions of the second species of ion are shown as being spread out to either side of a "focus region" X within the analyzer region. The dotted curved envelope surrounding the ions at FIG. 10*a* represents an approximate distribution of the focused ions. Accordingly, the number density of ions is assumed to be highest near the "focus region" X, and to decrease with increasing distance from the "focus region" X. It should also be noted that the first species of ion is not illustrated at FIG. 10*a*, but for the purpose of discussion they are assumed to be present and to display a similar shaped distribution about a different "focus region" Y. The solid envelope represents an approximate distribution of the first species of ion about the "focus region" Y.

Figure 10B:
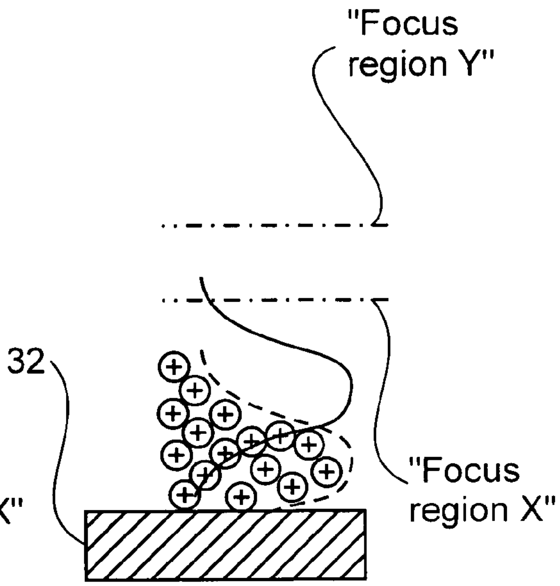
FIG. 10*b* shows the ions of FIG. 10*a* at time B" of the FAIMS separation that is illustrated at FIG. 9*a;*

Referring now to FIG. 10*b*, shown is the plurality of ions within a FAIMS analyzer region near the end of time B' of the separation that is illustrated at FIG. 9*a*. In particular, the direct current offset voltage has been changed from −5 V to −6 V. The ions of the second species of ions have been moved toward the electrode 32(check figure for label on electrode). For simplicity in illustration, the distribution of ions shown at FIG. 10***b* is shown to be substantially unchanged from the distribution of ions shown in FIG. 10*a*, however in practice if the ion cloud is not at equilibrium in a focus region, diffusion and space charge repulsion may result in enlargement of the distribution of ions. Some of the second species of ion have already collided with the FAIMS electrode 32 and are lost during time B'. In contrast, the solid curved envelope representing the distribution of the ions of the first species of ion within the analyzer region remains distal from the FAIMS electrode 32. Accordingly, during time B' ions of the second species of ion may collide with the electrode surface, whereas ions of the first species of ion substantially avoid collision with the electrode surface.

Referring again to FIG. 9*a*, during time B' the ions are being moved towards electrode 32 and are not at equilibrium in a focus region. During time B" the ions are in the focus region and the average ion trajectory shown as solid and dashed lines are running parallel to electrode 32 as shown in FIG. 9*a*. The distribution of ions is changing shape during time B', but has equilibrated during time B". Simultaneously however, the second species of ions may be lost during both B' and B" by collisions at the electrode wall, as discussed above. A distribution can simultaneously be at equilibrium and suffering a 'leakage' by contact with the edge of the distribution with the wall, giving rise to loss of ions to the wall of the electrode. Equilibrium means that the shape of the distribution changes slowly (or not at all) with time (but the total number of ions in the distribution may be simultaneously changing with time). Note that in FIG. 10*b* the overlap of the distribution of the second type of ion with the electrode 32 may be exaggerated and that no attempt has been made to correctly draw the equilibrium distribution during period B". In fact, this new equilibrium distribution later in B" will have an ion density near zero at the electrode surface, and will therefore be quite distorted compared to the distributions shown in FIGS. 10*a* and 10*b*. Nonetheless this equilibrium distribution will only change shape slowly as it is occupied by a decreasing number of ions. The distribution may change slightly in shape as the ions are lost because the shape of the distribution is in part dependent on the magnitude of the space charge ion-ion mutual repulsion among ions in the distribution. For example the shape of the distribution is usually wider when the number of ions is high, and slightly decreases in width when occupied by fewer ions. This is a small effect when the ion density is low.

Figure 10C:
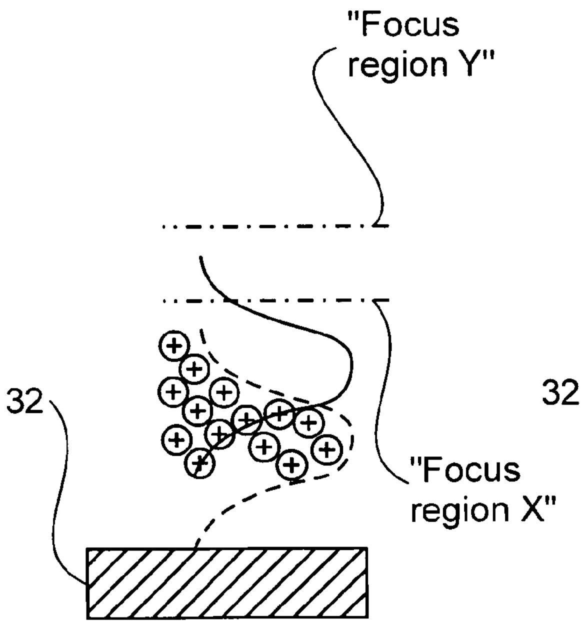
FIG. 10*c* shows the ions of FIG. 10*a* at time C' of the FAIMS separation that is illustrated at FIG. 9*a;*

Referring now to FIG. 10*c*, shown is a plurality of ions within a FAIMS analyzer region at a time near the middle of time C' of the separation that is illustrated at FIG. 9*a*. During time C', a direct current offset voltage of −5 V is applied, and the original focus regions shown as X and Y in FIG. 10*a* are re-established. During time C' ions of the first species of ion and any remaining ions of the second species of ion are drifting toward their respective focus regions falling into the virtual potential well, the bottom of which defines the focus regions X and Y. Note that the ion distributions shown in FIG. 10*c* are mid-way between focus regions X and Y defined by FIG. 10*a*, and the locations of the distributions shown in FIG. 10*b* characterized by the application of the direct current offset voltage of −6 V. Also during time C', first species of ions and the remaining ions of the second species of ion begin to establish a new distributions as a result of diffusion and space charge repulsion since the ions are not located at the focus locations X and Y. However, fewer ions of the second species of ion remain within the analyzer at time C' compared to the number originally shown at time A.

Figure 10D:
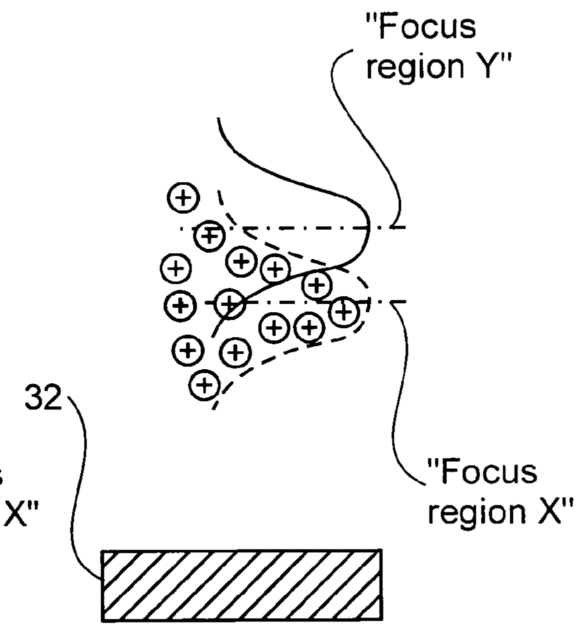
FIG. 10*d* shows the ions of FIG. 10*a* at time C" of the FAIMS separation that is illustrated at FIG. 9*a;*

Referring now to FIG. 10*d*, shown is a plurality of ions within a FAIMS analyzer region at time C" of the separation that is illustrated at FIG. 9*a*. The ions continue to be focused at time C", and the effects of diffusion and space-charge repulsion cause the remaining ions of the second type of ion to spread out on either side of the "focus region," X. Similarly, ions of the not illustrated first type of ion are focused about the "focus region," Y.

Advantageously, subsequent detection of the ions illustrated at FIG. 10*d* results in improved sensitivity with respect to the first species of ion, since the flow of ions within the analyzer region is enriched in the first species of ion relative to the second species of ion.

Figure 11:
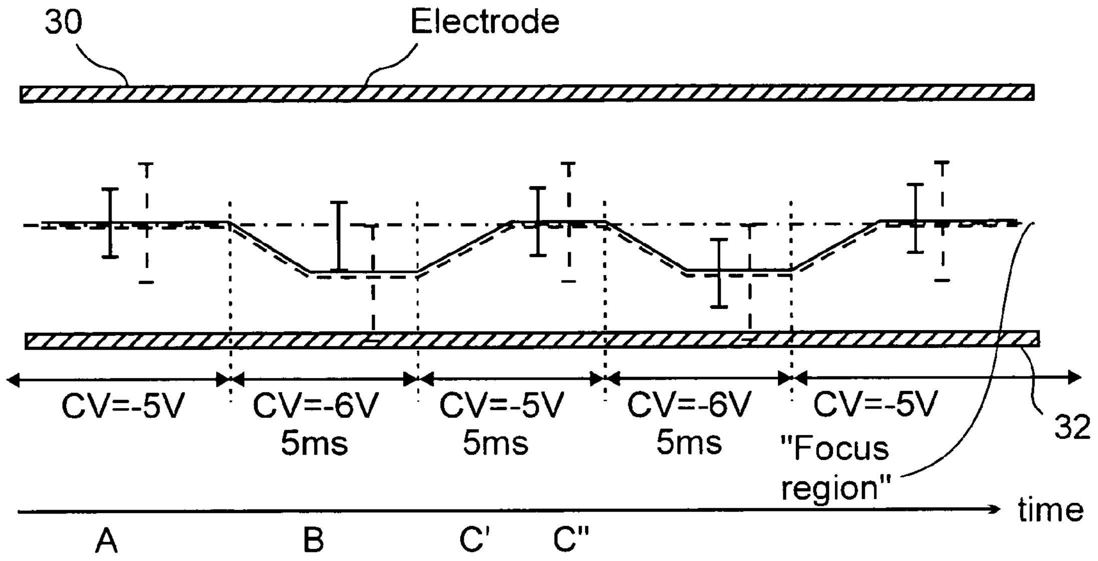
FIG. 11 shows simulated average ion trajectories of two species of ions, both species of ion being focused to a same focus region within a FAIMS analyzer region, during a FAIMS separation, which is performed in accordance with a method according to any one of the first, second and third embodiments of the instant invention.

Referring now to FIG. 11, shown are simulated average ion trajectories of two species of ions, both species of ion being focused to a same focus region within a FAIMS analyzer region, during a FAIMS separation, which is performed in accordance with a method according to any one of the first, second and third embodiments of the instant invention. In FIG. 11, the simulated average ion trajectory of a first species of ion is shown as a solid line, and the simulated average ion trajectory of a second species of ion is shown as a dashed line. One of ordinary skill in the art will appreciate that a rapid oscillatory motion is also superimposed upon the average ion trajectory of the first and second species of ion, as a result of the applied asymmetric waveform. Accordingly, the simulated average ion trajectory represents the net motion of the first and second species of ion through the analyzer region. Furthermore, the time axis has not been drawn to scale.

For the purpose of this discussion, it is assumed that the second species of ion has a higher low field ion mobility value than the first species of ion. Accordingly, the second species of ion is expected to oscillate more widely, and diffuse and migrate to a greater extent during the applied asymmetric waveform than the first species of ion, and therefore the distribution of the second species of ion about the focus region is expected to occupy a larger volume of space compared to the distribution of a similar quantity of the first species of ion.

Figure 12A:
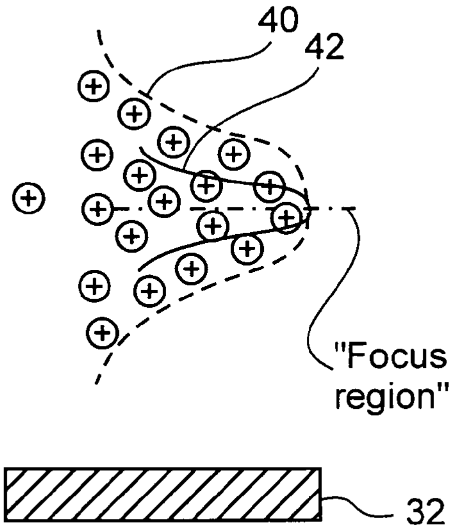
FIG. 12*a* shows a plurality of one of the species of ions of FIG. 11 within a FAIMS analyzer region, at time A of the FAIMS separation that is illustrated at FIG. 11.

Referring now to FIG. 12*a*, shown is a plurality of one of the species of ions of FIG. 11 within a FAIMS analyzer region, at time A of the FAIMS separation that is illustrated at FIG. 11. In FIG. 12*a*, only electrode 32 of the two electrodes defining the analyzer region is shown. For improved clarity, only the second species of ion is shown. The ions are shown as being "focused" about a "focus region," but as occupying a finite volume of space within the analyzer region. The dotted curved envelope 40 surrounding the ions represents an approximate distribution of the ions about the "focus region." The number density of ions is highest near the focus region and decreases with increasing distance from the focus region. It should be noted that the first species of ion is not illustrated at FIG. 12*a*, but for the purpose of discussion they are assumed to be present and to display a similar shaped, but smaller or more compact, distribution about the same "focus region." The solid envelope 42 shown at FIG. 12*a* represents the approximate distribution of the first species of ion about the "focus region." The difference in the width of the ion distributions is exaggerated for illustrative purposes.

Still referring to FIG. 12*a*, although the details of the reasons for the differences in the width of the distribution are not experimentally proven, several possible mechanisms may be postulated. In a first effect, the ions with higher mobility travel further during each cycle of the high frequency asymmetric waveform. This means that if all other effects were identical, the second ion with higher low field ion mobility will occupy a wider range of radial space, shown by the dashed distribution 40 in FIG. 12*a* than a first ion with the distribution indicated by the solid line 42. This effect can be maximized for beneficial ion separation by judicious selection of the combination of frequency and amplitude of the asymmetric waveform. In a possible second effect, the ion with higher mobility also has a higher coefficient of diffusion, since these physical constants are related together by a relation called the Einstein relation. This coefficient of diffusion also has an E/N dependence and a directional dependence usually referred to as $D_L$ and $D_T$ which are describe diffusion aligned and perpendicular with the direction of the field respectively. The ion with higher coefficient of diffusion may occupy wider radial space, as shown by the dashed line 40 in FIG. 12*a*. Finally in a possible third effect, under some circumstances two ions may coincidentally be focused at the same physical locations shown in FIG. 12*a*, but because of the details of the behavior of their individual $K_H$/K ratio as a function of E/N, the two ions may feel different focusing strengths and consequently have different widths of ion distributions as shown in FIG. 12*a*. Although these ions may be separated using this method, in some cases the separation may be also be accomplished at another setting of DV. In practice however, this may not be practical if the DV is at a maximum value determined either by the electronic supply available to provide the asymmetric waveform or by the onset of electrical discharges in the analyzer region.

Figure 12B:
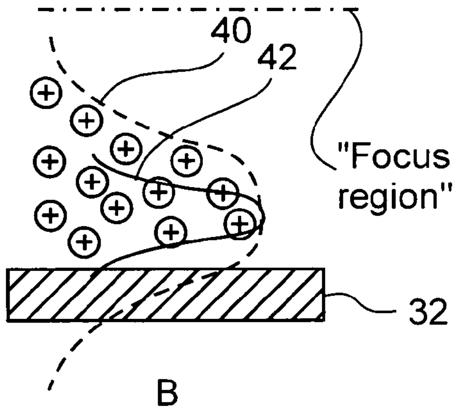
FIG. 12*b* shows the ions of FIG. 12*a* at time B of the FAIMS separation that is illustrated at FIG. 11.

Referring now to FIG. 12*b*, shown is the plurality of ions within a FAIMS analyzer region at the end of time B of the separation that is illustrated at FIG. 11. In particular, the direct current offset voltage has been changed from −5 V to −6 V. The ions of the second species of ion have been moved toward the electrode 32. For simplicity of illustration, the distribution of ions shown at FIG. 12*b* is substantially unchanged from that in FIG. 12*a*, however in practice the distribution of ions may be narrower or wider depending whether the distribution is moved closer to the inner electrode or the outer electrode of cylindrical geometry, and furthermore a real distribution impinging on an electrode surface will be distorted to have a real ion density near zero at the electrode surface. Nevertheless, with the obvious simplifications of the drawing of FIG. 12*b* noted, some ions of the second species of ion have collided with the FAIMS electrode 32 and are lost. In contrast, the solid curved envelope representing the distribution of the ions of the first species of ion within the analyzer region remains distal from the FAIMS electrode 32. Accordingly, during time B the ions of the second species of ion collide with the electrode surface, whereas the ions of the first species of ion substantially avoid collision with the electrode surface.

Still referring to FIG. 12*b*, the distribution of the first ion shown by the solid line, is very close to the electrode 32. It is anticipated that a gradual 'leakage' of the first type of ion from the distribution may occur although only the smallest edge of the distribution is in contact with the electrode. This loss or 'leakage' of ions from the edge of the distribution is dependent on the degree of overlap of the distribution with the electrode. For completeness and accuracy in this discussion it should also be recognized that the distributions do not drop to zero ion density at their edges in a stepwise fashion. The distribution drops in density over a wide region, but for purposes of this discussion the distribution can be considered effectively and practically zero if the number of ions lost is very low relative to the number in the total ion cloud enveloped by the distribution curves shown in these figures.

Figure 12C:
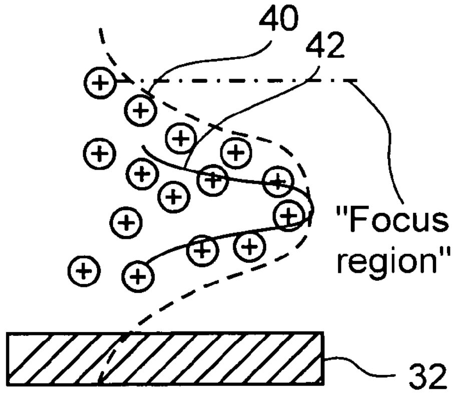
FIG. 12*c* shows the ions of FIG. 12*a* at time C' of the FAIMS separation that is illustrated at FIG. 11.

Referring now to FIG. 12*c*, shown is a plurality of ions within a FAIMS analyzer region at the mid-point of time C' of the separation that is illustrated at FIG. 11. During time C', a direct current offset voltage of −5 V is applied. The first species of ion and any remaining ions of the second species of ion are falling into the virtual potential well toward the focus region. Also during time C', the first species of ions and the remaining ions of the second species of ion spread radially as a result of diffusion and space charge repulsion since the ions are in transit and are not yet located at the bottom of the virtual potential well. However, fewer ions of the second species of ion remain within the analyzer at time C' compared to the number originally shown at time A.

Figure 12D:
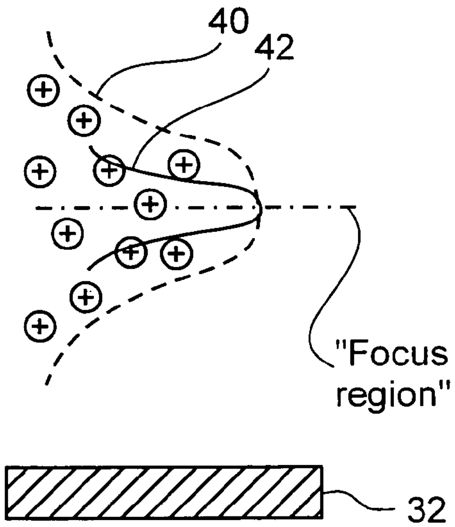
FIG. 12*d* shows the ions of FIG. 12*a* at time C" of the FAIMS separation that is illustrated at FIG. 11.

Referring now to FIG. 12*d*, shown is a plurality of ions within a FAIMS analyzer region at time C" of the separation that is illustrated at FIG. 11. The ions continue to be focused at time C", and the effects of diffusion and space-charge repulsion cause the remaining ions of the second type of ion to be distributed on either side of the "focus region." Similarly, the not illustrated first type of ion is also in an equilibrium distribution about the "focus region."

Advantageously, subsequent detection of the ions illustrated at FIG. 12*d* results in improved sensitivity of the first species of ion relative to the second species of ion, since the flow of ions within the analyzer region is enriched in the first species of ion relative to the second species of ion. In some cases however, it is expected both ions will be lost to some degree when this method is employed to beneficially improve the proportion of the first species detected relative to the second species of ions. By considering the close proximity of the distribution of the first ion (solid trace in FIG. 12*b*) to the electrode 32, it is not unexpected that improved removal of the second type of ion from the first type of ion will be accompanied by some loss of the first type of ion (and a much higher loss of the second type of ion), and it is not unexpected that in some cases the separation will continue to improve at the sacrifice of sensitivity or number of ions of the first type of ion detected.

Figure 13A:
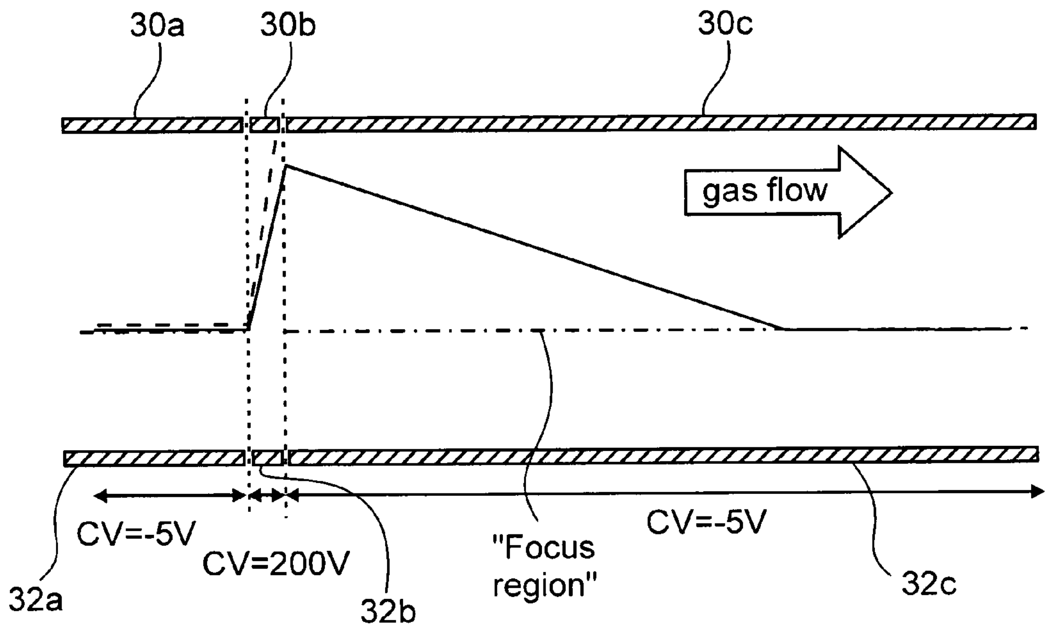
FIG. 13*a* shows simulated average ion trajectories of two species of ions, both species of ion being focused to a same focus region within a segmented FAIMS analyzer region, during a combined FAIMS/DTIMS separation, which is performed in accordance with a method according to any one of the first, second and third embodiments of the instant invention; and, FIG. 13*b* shows plots of the direct current and asymmetric waveform potentials that are applied to each of the electrode segments of the segmented FAIMS analyzer region during the combined FAIMS/DTIMS separation that is shown at FIG. 13*a.*

Optionally, a segmented analyzer region is used to provide the different electrical field conditions that are necessary for separating ions according to the FAIMS principle and on the basis of differences in their low field ion mobility values. The upper electrode shown in FIG. 13*a* is divided into segments 30*a*, 30*b* and 30*c* each connected to electronic power supplies, and the lower electrode in FIG. 13*a* is also divided into segments 32*a*, 32*b* and 32*c* also connected to electronic power supplies which provide the voltages to these electrodes. The electrodes in FIG. 13*a* may be flat plates, or concentric cylinders, as non-limiting examples. Preferably the high voltage, high frequency asymmetric waveform is applied to a complete adjacent set of electrodes. As a non-limiting example, segments 32*a*, 32*b* and 32*c* may be the axially aligned ring segments composing an inner cylinder of a cylindrical geometry FAIMS and the asymmetric waveform voltage is applied to all of 32*a*, 32*b* and 32*c*. Direct current voltages are applied to all segments, including being superimposed on the asymmetric waveform applied to segments 32*a*, 32*b* and 32*c*. In some cases the direct current voltage will be ground potential.

Referring again to FIG. 13*a*, shown are simulated average ion trajectories of two species of ions within a FAIMS analyzer region during a combined FAIMS/DTIMS separation, which is performed in accordance with a method according to any one of the first, second and third embodiments of the instant invention. In FIG. 13*a*, the simulated average ion trajectory of a first species of ion is shown as a solid line, and the simulated average ion trajectory of a second species of ion is shown as a dashed line. One of ordinary skill in the art will appreciate that a rapid oscillatory motion is also superimposed upon the average ion trajectory of the first and second species of ion, as a result of the applied asymmetric waveform potential. Accordingly, the simulated average ion trajectory represents the net motion of the first and second species of ion through the analyzer region.

Figure 13B:
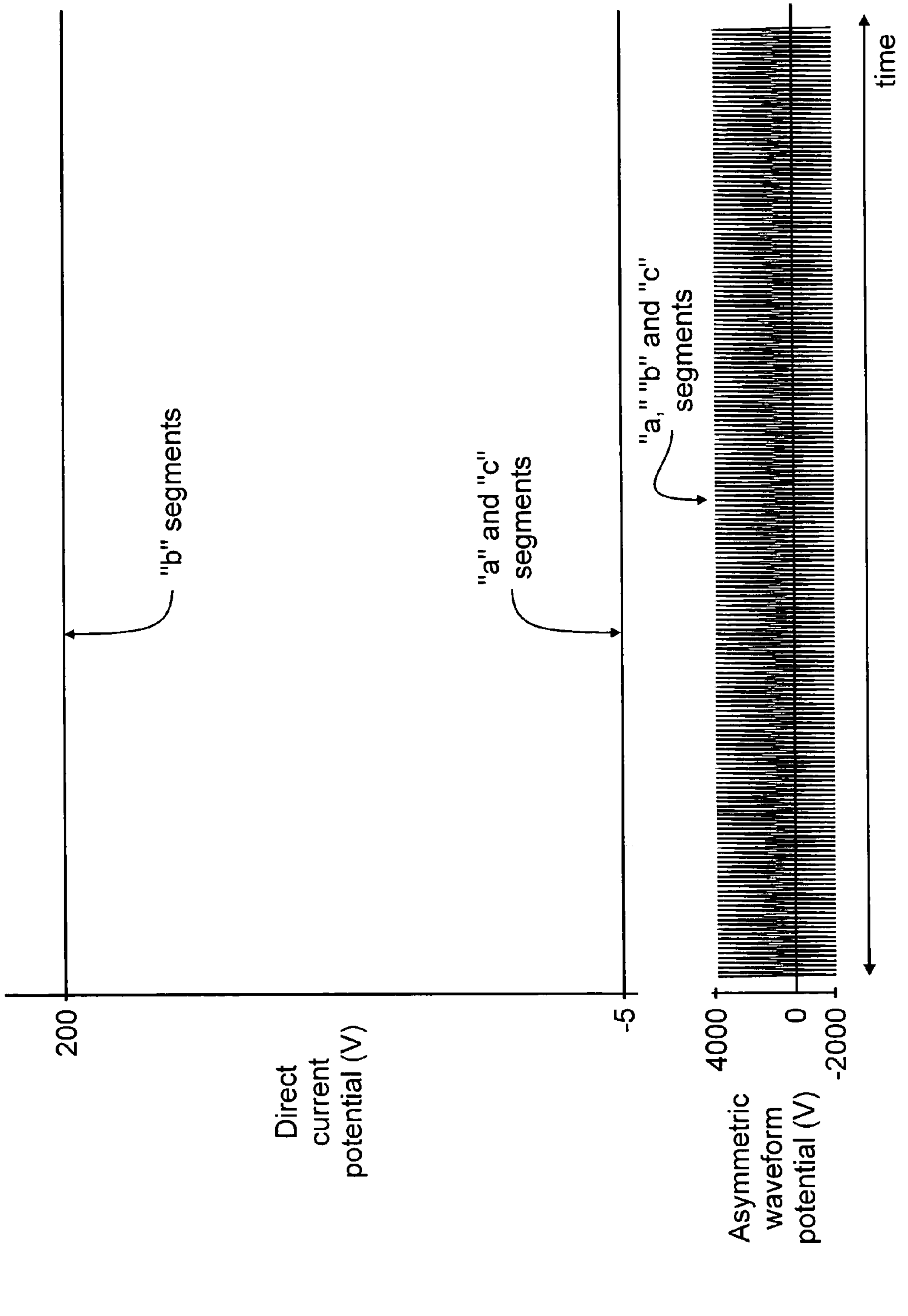

Referring now to FIG. 13*b*, shown are plots of the direct current potential (upper plot) and the asymmetric waveform potential (lower plot) that are applied to each of the "a," "b," and "c" segments of the segmented analyzer region during the combined FAIMS/DTIMS separation that is illustrated at FIG. 13*a*.

Referring again to FIG. 13*a*, when the ions are carried by a gas flow in the analyzer region between the electrode segments 30*a* and 32*a*, the first and second species of ion are focused to a "focus region" that is indicated by the dash-dot line. In practice, both the first and second species of ion are actually spread out to either side of the "focus region" due to diffusion and space charge repulsion. Since the first and second species of ion exhibit virtually identical high field behavior, and are focused to a same "focus region," it is not apparently possible to separate the first species of ion and the second species of ion using FAIMS alone. As shown at FIG. 13*b*, an asymmetric waveform is applied to one of the electrode segments 30*a* and 32*a*, and a direct current potential of −5 V is applied between the electrode segments 30*a* and 32*a*.

When the ions are moving between the electrode segments 30*b* and 32*b*, the first and second species of ions are separated on the basis of differences in their low field ion mobility values. As shown at FIG. 13*b*, an asymmetric waveform is applied to one of the electrode segments 30*b* and 32*b*, and a direct current potential of +200 V is applied between the electrode segments 30*b* and 32*b*. Referring again to FIG. 13*a*, when the ions are carried by the flow of carrier gas into the space between the electrode segments 30*b* and 32*b*, both the first and second species of ion begin to move rapidly in a direction toward the electrode segment 30*b*. The species of ion having the highest low field ion mobility value, in this example the second species of ion, moves more quickly toward the electrode segment 30*b* compared to the species of ion having the lowest low field ion mobility value, in this example the first species of ion. Accordingly, under identical electrical field conditions between the electrode segments 30*b* and 32*b*, the second species of ion requires a shorter period of time to arrive at, and collide with, the electrode segment 30*b*.

When the ions are carried beyond the space between electrode segments 30*b* and 32*b*, and enter the space between electrode segments 30*c* and 32*c*, the first species of ion and any remaining ions of the second species of ion move slowly in a direction away from the FAIMS electrode 30*c*. As is shown at FIG. 13*b*, an asymmetric waveform is applied to one of the electrode segments 30*c* and 32*c*, and a direct current potential of −5 V is applied between the electrode segments 30*c* and 32*c*. The ions drift slowly towards the focus region, becoming more spread out as a result of diffusion and space charge repulsion. At some time after the ions have returned to the "focus region," the original narrow radial spacing of the ions is restored. Of course, application of an asymmetric waveform potential to each of segments "a," "b," and "c," and application of a same direct current potential, such as for instance −5 V, to each of segments "a," "b," and "c," establishes electrical field conditions extending continuously from an ion origin end of the segmented analyzer region to an ion detection end of the segmented analyzer region for separating ions according to the FAIMS principle. Advantageously, the segmented analyzer region may be used to separate ions on the basis of the FAIMS principle only, or to separate ions according to the combined FAIMS/DTIMS separation described above.

Advantageously, the potential difference between segment 30*b* and 32*b* can be adjusted to ensure separation of the first species of ion and the second species of ion. The flow rate of gas, and the width of the segments 30*b* and 32*b* affect the time the ions spend between segments 30*b* and 32*b*, therefore the voltage is adjusted to beneficially affect the separation of the ions of interest.

It is recognized that the electric fields do not re-adjust immediately between segments, but rather in all cases the potentials on a segment modify the electric fields in areas extending on either side of a given segment. The widths of the segments, and the trajectories shown in FIG. 13*a* are shown for illustrative purposes only, to convey the principles of this embodiment.

Optionally, a number of segments other than three is provided. For instance, five segments are provided for performing one additional separation of the ions based upon their low field ion mobility values. Alternatively, four segments are provided if it is desired to return the ions rapidly to the focus region subsequent to effecting a separation of the ions on the basis of their low field ion mobility values.

Optionally, the widths of the segments are varied along the length of a multi-segment electrode assembly.

Optionally, ions of at least the first species of ion are detected subsequent to being focused between the electrode segments 30*c* and 32*c*. Advantageously, the ions that are detected are enriched in the first species of ion relative to the second species of ion, as a result of the additional separation based upon the low field ion mobility values. Optionally, the ions are collected or processed otherwise.

Numerous other embodiments may be envisaged without departing from the spirit and scope of the invention.

What is claimed is:

1. A method of separating ions, including a first species of ion and a second species of ion that are transmitted through an analyzer region under substantially identical electrical field conditions, the method comprising:

providing an analyzer region that is defined by a space between a first electrode surface and a second electrode surface and that has a length that is defined between an ion origin end and an ion detection end;

providing ions within the analyzer region at the ion origin end thereof, the ions including a first species of ion and a second species of ion;

during a period of time that is shorter than the time that is required for an ion to traverse the length of the analyzer region under a given set of operating conditions, providing sequentially:

i) first electric field conditions for substantially retaining the first species of ion within the analyzer region, by the application of an asymmetric waveform potential to one of the first electrode surface and the second electrode surface, and by the application of a first direct current potential difference between the first electrode surface and the second electrode surface;

ii) second electric field conditions for preferentially colliding the second species of ion with one of the first electrode surface and the second electrode surface, by the application of an asymmetric waveform potential to the one of the first electrode surface and the second electrode surface, and by the application of a second direct current potential difference between the first electrode surface and the second electrode surface, the second direct current potential difference having at least one of a direction and a magnitude that is different compared to that of the first direct current potential difference; and, iii) third electric field conditions for substantially retaining the first species of ion within the analyzer region, by the application of an asymmetric waveform potential to the one of the first electrode surface and the second electrode surface, and by the application of a third direct current potential difference between the first electrode surface and the second electrode surface.

2. A method of separating ions according to claim 1, comprising detecting at least the first species of ion subsequent to the first species of ion being subjected to the sequentially provided first electric field conditions, second electric field conditions and third electric field conditions.

3. A method of separating ions according to claim 1, wherein the third direct current potential difference has both a direction and a magnitude that is approximately identical to a direction and a magnitude of the first direct current potential difference.

4. A method of separating ions according to claim 3, wherein the first electric field conditions, the second electric field conditions, and the third electric field conditions are formed by the application of a same asymmetric waveform potential.

5. A method of separating ions according to claim 4, wherein the first electric field conditions are approximately identical to the third electric field conditions.

6. A method of separating ions according to claim 3, comprising detecting at least the first species of ion subsequent to the first species of ion being subjected to the sequentially provided first electric field conditions, second electric field conditions and third electric field conditions.

7. A method of separating ions according to claim 1, wherein the first electric field conditions, the second electric field conditions, and the third electric field conditions are formed by the application of a same asymmetric waveform potential.

8. A method of separating ions according to claim 1, comprising providing a flow of a carrier gas within the analyzer region, for transporting the first species of ion and the second species of ion in a direction along the length of the analyzer region.

9. A method of separating ions according to claim 1, wherein at least one of the first electric field conditions and the third electric field conditions is selected for focusing the first species of ion within the analyzer region.

10. A method of separating ions, including a first species of ion and a second species of ion that are transmitted through an analyzer region under substantially identical electrical field conditions, the method comprising:

providing an analyzer region having an ion origin end and an ion detection end, the analyzer region capable of supporting electrical field conditions extending continuously from the ion origin end to the ion detection end for separating ions according to the FAIMS principle;

providing ions within the analyzer region at the ion origin end, the ions including a first species of ion and a second species of ion;

separating the ions within the analyzer region according to the FAIMS principle, such that the first species of ion and the second species of ion are selectively transmitted along a time-averaged first direction through a portion of the analyzer region between the ion origin end and the ion detection end; and, separating the first species of ion and the second species of ion one from the other within the analyzer region according to a difference in their low field ion mobility values, such that relatively more of one of the first species of ion and the second species of ion is transmitted to the ion detection end than is transmitted absent separating the first species of ion and the second species of ion within the analyzer region according to a difference in their low field ion mobility values.

11. A method according to claim 10, comprising detecting at least the one of the first species of ion and the second species of ion that is transmitted to the ion detection end.

12. A method according to claim 10, comprising focusing the first species of ion and the second species of ion within the analyzer region subsequent to separating the first species of ion and the second species of ion according to a difference in their low field ion mobility values.

13. A method according to claim 10, comprising focusing the first species of ion and the second species of ion within the analyzer region prior to separating the first species of ion and the second species of ion according to a difference in their low field ion mobility values.

14. A method according to claim 13, comprising focusing the first species of ion and the second species of ion within the analyzer region subsequent to separating the first species of ion and the second species of ion according to a difference in their low field ion mobility values.

15. A method according to claim 12, comprising separating the first species of ion and the second species of ion within the analyzer region according to a difference in their low field ion mobility values at least a second time.

16. A method according to claim 10, comprising performing at least two cycles of separating the ions within the analyzer region according to the FAIMS principle and subsequently according to a difference in low field ion mobility values.

17. A method according to claim 10, wherein the electrical field conditions for separating ions according to the FAIMS principle are established by the application of an asymmetric waveform potential and a direct current potential difference between two electrode surfaces of the analyzer region.

18. A method according to claim 17, wherein separating the first species of ion and the second species of ion within the analyzer region according to a difference in their low field ion mobility values comprises changing at least one of a magnitude and a direction of the direct current potential difference, so as to effect a drifting motion of the ions within the analyzer region in a direction approximately transverse to the length of the analyzer region.

19. A method according to claim 18, wherein a duration of the drifting motion is selected such that the one of the first species of ion and the second species of ion having the highest low field ion mobility value collides preferentially with an electrode surface of the analyzer region.

20. A method according to claim 10, comprising providing a flow of a carrier gas within the analyzer region, for transporting the first species of ion and the second species of ion in a direction along the length of the analyzer region.

21. A method according to claim 10, wherein the analyzer region is a segmented analyzer region, and wherein one segment for separating ions according to a difference in their low field ion mobility values is disposed between two segments each for separating ions according to the FAIMS principle.

22. A method according to claim 21 wherein the one segment for separating ions according to a difference in their low field ion mobility values is selectively operable in a mode for separating ions according to the FAIMS principle.

23. A method of separating ions, including a first species of ion and a second species of ion that are transmitted through an analyzer region under substantially identical electrical field conditions, the method comprising:

providing an analyzer region tint is defined by a space between a first electrode surface and a second electrode surface and that has a length that is defined between an ion origin end and an ion detection end;

providing ions within the analyzer region at the ion origin end threat the ions including a first species of ion and a second species of ion;

subjecting the ions within the analyzer region to a first transverse electric field, the first transverse electric field suitable for substantially retaining the first species of ion and the second species of ion within the analyzer region and resulting from the application of an asymmetric waveform potential to one of the first electrode surface and the second electrode surface, and by the application of a direct current potential difference between the first electrode surface and the second electrode surface;

at least partially separating the second species of ion from the first species of ion by changing at least one of a magnitude and a direction of the direct current potential difference, to effect a drifting motion of at least some of the ions that were previously subjected to the transverse electric field in a direction substantially toward one of the first electrode surface and the second electrode surface, so as to preferentially collide the second species of ion with the one of the first electrode surface and the second electrode surface; and, restoring the first transverse electric field, to substantially retain the first species of ion within the analyzer subsequent to the second species of ion being at least partially separated from the first species of ion.

24. A method of separating ions according to claim 23, comprising detecting the first species of ion subsequent to restoring the first transverse electric field.

25. A method of separating ions according to claim 23, comprising repeating the steps of at least partially separating the second species of ion from the first species of ion by changing at least one of a magnitude and a direction of the direct current potential difference, and of restoring the first transverse electric field, so as to separate further the second species of ion from the first species of ion.

26. A method of separating ions according to claim 23, comprising prior to restoring the first transverse electric field, providing other electric field conditions within the analyzer for effecting a drifting motion of the at least some of the ions that were previously subjected to the transverse electric field in a direction substantially away from the one of the first electrode surface and the second electrode surface.

27. A method of separating ions according to claim 23, comprising providing a flow of a carrier gas within the analyzer region, for transporting the first species of ion and the second species of ion in a direction along the length of the analyzer region.

28. A method of separating ions according to claim 23, wherein the first transverse electric field is selected for focusing at least the first species of ion within the analyzer region.

29. A method of separating ions, including a first species of ion and a second species of ion that are transmitted through an analyzer region under substantially identical electrical field conditions, the method comprising:

providing an analyzer region having an ion origin end and an ion detection end, the analyzer region comprising two electrode surfaces that are disposed one relative to the other in a spaced-apart facing arrangement, the two electrode surfaces for providing electrical field conditions therebetween for separating ions according to the FAIMS principle when operating in a first mode of operation and for separating ions according to a difference in low field ion mobility values when operating in a second mode of operation;

providing ions within the analyzer region at the ion origin end, the ions including a first species of ion and a second species of ion;

separating the ions within the analyzer region according to the FAIMS principle, such that the first species of ion and the second species of ion are selectively transmitted along a time-averaged first direction through a portion of the analyzer region between the ion origin end and the ion detection end; and, separating the first species of ion and the second species of ion one from the other within the analyzer region according to a difference in their low field ion mobility values, such that relatively more of one of the first species of ion and the second species of ion is transmitted to the ion detection end than is transmitted absent separating the first species of ion and the second species of ion within the analyzer region according to a difference in their low field ion mobility values.

* * * * *

UNITED STATES PATENT AND TRADEMARK OFFICE

CERTIFICATE OF CORRECTION

PATENT NO. : 7,057,166 B2

APPLICATION NO. : 10/875291

DATED : June 6, 2006

INVENTOR(S) : Roger Guevremont et al.

It is certified that error appears in the above-identified patent and that said Letters Patent is hereby corrected as shown below:

Claim 23, column 29, line 48:
replace “end threat the ions including”
with --end thereof, the ions including--

Signed and Sealed this

Fourteenth Day of April, 2009

JOHN DOLL

*Acting Director of the United States Patent and Trademark Office*